(12) United States Patent
Yeung et al.

(10) Patent No.: US 10,941,060 B2
(45) Date of Patent: Mar. 9, 2021

(54) PULSED ELECTRIC FIELD FOR DRINKING WATER DISINFECTION

(71) Applicant: THE HONG KONG UNIVERSITY OF SCIENCE AND TECHNOLOGY, Hong Kong (CN)

(72) Inventors: King Lun Yeung, Hong Kong (CN); Joseph Kai Cho Kwan, Hong Kong (CN); Siu Ming Kwan, Hong Kong (CN); Oi Wa Lee, Hong Kong (CN); Pik Shuen Karen Hung, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 1148 days.

(21) Appl. No.: 15/241,430

(22) Filed: Aug. 19, 2016

(65) Prior Publication Data

US 2017/0029300 A1    Feb. 2, 2017

Related U.S. Application Data

(63) Continuation-in-part of application No. 14/442,588, filed as application No. PCT/CN2013/001426 on Nov. 21, 2012, now Pat. No. 10,577,264.

(60) Provisional application No. 61/796,832, filed on Nov. 21, 2012, provisional application No. 62/283,109, filed on Aug. 21, 2015, provisional application No. 62/285,585, filed on Nov. 3, 2015.

(51) Int. Cl.
    *C02F 1/48*    (2006.01)
(52) U.S. Cl.
    CPC .............. *C02F 1/48* (2013.01); *C02F 2201/48* (2013.01); *C02F 2303/04* (2013.01)

(58) Field of Classification Search
    CPC ........ C02F 1/48; C02F 1/325; C02F 2307/06; C02F 2303/04; C02F 2201/001; C02F 2201/3222; C23C 24/00; A61L 2/10; E03C 1/0404; E03C 1/046; B64D 11/02
    See application file for complete search history.

(56) References Cited

U.S. PATENT DOCUMENTS

| 4,287,268 A * | 9/1981 | Coetzer ................... H01M 4/02 361/508 |
| 2004/0084381 A1* | 5/2004 | Korenev ................... A23L 3/32 210/748.01 |
| 2015/0321929 A1* | 11/2015 | Legzdins .................. C25B 9/08 205/620 |

FOREIGN PATENT DOCUMENTS

| CN | 1863737 A | 11/2006 |
| CN | 101665300 A | 3/2010 |
| CN | 101786752 A | 7/2010 |
| CN | 102050512 A | 5/2011 |

(Continued)

*Primary Examiner* — Cameron J Allen
(74) *Attorney, Agent, or Firm* — Nath, Goldberg & Meyer; Joshua B. Goldberg

(57) ABSTRACT

The present subject matter is directed to water disinfection by pulsed electric field (PEF) systems. The present subject matter relates to a pulsed electric field assembly with a separator that separates and disinfects the microorganisms in drinking water. The present subject matter relates to an anti-corrosion electrode, particularly an electrode having a zeolite coating layer serving as a protector, a process for the preparation a zeolite coating on a conducting electrode substrate, and application of the zeolite coated electrode on water electrolysis and PEF systems.

23 Claims, 26 Drawing Sheets

(56) References Cited

FOREIGN PATENT DOCUMENTS

| | | | |
|---|---|---|---|
| CN | 102417231 A | 4/2012 | |
| KR | 20020062865 A * | 7/2002 | |
| WO | 2007044609 A1 | 4/2007 | |
| WO | WO-2007044609 A1 * | 4/2007 | ............ C02F 1/4695 |
| WO | WO-2014079149 A1 * | 5/2014 | |

* cited by examiner

PULSED ELECTRIC FIELD FOR DRINKING WATER DISINFECTION

CROSS REFERENCE TO RELATED APPLICATIONS

This application is a continuation-in-part of U.S. patent application Ser. No. 14/442,588 filed on May 13, 2015, a national phase application filed under 35 U.S.C. 371 as a national stage of PCT/CN2013/001426 filed Nov. 21, 2013, which claims priority to U.S. Provisional Application No. 61/796,832 filed Nov. 21, 2012. This continuation-in-part application further claims priority to U.S. Provisional Application No. 62/283,109 filed on Aug. 21, 2015 and U.S. Provisional Application No. 62/285,585 filed Nov. 3, 2015. The content of each priority application is hereby incorporated by reference in its entirety.

TECHNICAL FIELD

The present subject matter relates generally to the field of drinking water disinfection, and a device that disinfects microorganisms in drinking water by generating a pulsed electric field (PEF) between micro-engineered electrodes immersed in the water. The present subject matter relates to a pulsed electric field assembly with the micro-gap between the PEF electrodes maintained by a thin physical separator that is porous such as but not limited to water filters, filtration membranes (e.g., microfiltration membrane, ultrafiltration membranes, nanofiltration membranes and reverse osmosis membranes), ion-exchangers, adsorbers (e.g., activated carbon and activated carbon clothes) or a combinations thereof. This allows not only disinfection of microorganisms from drinking water, but also purification of drinking water from unwanted solids and other suspended and dissolved pollutants that affect water quality. The present subject also relates to an anti-corrosion electrode, particularly an electrode having a zeolite coating layer serving as a protector, a process for the preparation of a zeolite coating on a conducting electrode substrate, and application of the zeolite coated electrode in a PEF system.

BACKGROUND

Quality drinking water is associated with human health, and safe drinking water supply is a public health issue. Globally, about 1.1 billion people do not have access to improved sanitation facilities for safe water supply, and about 2 million people die every year because of waterborne diseases. Although most victims live in developing countries, well-developed countries still suffer from fatal waterborne diseases (World Health Organization, 2012).

The U.S. Center for Disease Control and Prevention (CDC) and Environmental Protection Agency (EPA) have recorded waterborne disease outbreaks in the U.S. since 1971 (CDC, 2011). Despite advanced water treatment and sanitation facilities, waterborne disease outbreaks continue to occur. From 1971 to 2002, there were 764 documented disease outbreaks related to drinking water in the U.S., resulting in roughly 0.6 million cases of illness and 79 fatalities (Reynolds et al., 2008 and Reynolds et al., 2011). It was estimated that in the U.S. alone, 26 million cases of infection and 13 million cases of illness each year are associated with unsafe municipal water caused by the inadequacy of treatment plants, contamination of water sources, and intrusions into water distribution systems. More recently, 33 drinking water-related outbreaks were reported from 2009-2010, and a waterborne disease outbreak occurred in a hospital in 2012, affecting several patients.

Over 60% of identified outbreaks were due to *Legionella* in plumbing systems and deficiency in water distribution systems (CDC, 2013). Outbreaks raise concern about public health risks from water distribution contamination. Drinking water can act as a carrier for a number of hazardous microorganisms, such as pathogens from fecal contamination (e.g. *E.coli.* O157) and infectious microorganisms (e.g. *Legionella*) (Committee on public water supply distribution systems: assessing and reducing risks, National Research Council, 2006). Therefore, water systems can serve as a reservoir of contaminated water. Drinking water can expose infectious agents and contaminants through water distribution systems to households.

A well-developed water treatment plant undergoes several steps including coagulation, flocculation, sedimentation, and disinfection (EPA, 2009). Water can then be transferred throughout the system and pipes to domestic users after the treatment process. Two major disinfection processes are used to inactivate microbes. Primary disinfection provides a disinfection barrier to inactivate microbes after filter media in water treatment plants and is the main disinfection process to kill microorganisms. Primary disinfectants including ozone, chlorine, chlorine dioxide, and ultraviolet (UV) radiation are used in this process to inactive the pathogens in water, such as bacteria, viruses, and protozoa.

Secondary disinfection provides residual disinfection power with achieved water quality at water treatment plants throughout the distribution system up to the tap (Fewtrekk et al., 2001). To prevent microbial regrowth and maintain biological stability in a water distribution system, the Total Coliform Rule (TCR) provides disinfectant residual should be maintained at least at 0.2 mg/L throughout the distribution system. Chlorine and chlorine dioxide are typically used to maintain disinfectant residual in a distribution system (EPA, 1989). The selection of a secondary disinfectant not only seeks microorganism inactivation efficiency, but also concerns the water quality after primary disinfection. The water quality parameters include disinfection byproducts (DBPs) formation, total organic carbon, turbidity, and pH, etc. High levels of disinfectant residual affect taste and odor, and it is possible to form DBPs during a long system. Chlorine can produce variety of chlorinated DBPs, such as total trihalomethane (TTHMs), a possible carcinogen.

Once drinking water is treated at a water treatment plant, it is transferred to consumers by pipes or is stored in reservoirs. Dissolved organic compound content in drinking water can cause problems such as increased chlorine consumption and bacterial colonization in water distribution systems. Concentration of disinfectants, such as chlorine or ozone, drops gradually when traveling downstream from the water distribution system. These microorganisms are able to survive in distribution pipes and are flushed out from domestic faucets. Bacterial colonization on water pipes and storage tanks can result in biofilms. Biofilm formation can enhance survivability by attachment to a solid surface. Bacteria can gain continuous nutrients and oxygen from water flow (Maier et al., 2000). Furthermore, biofilms can coexist with residual chlorine in drinking water distribution systems. *E.coli* in a biofilm is 2400 times more resistant to chlorine than as a single cell in water (Le Chevallier et al., 1988). Therefore, waterborne bacteria can survive enriched treatments of water disinfection such as chlorination (Burne et al., 2012), and microbial infection through drinking water is still possible.

Indeed, drinking water distribution systems harbor rich microbial communities and the conventional method of using residual disinfectants is often ineffective in controlling the microbial growth (Servais et al., 1995, Kilb et al, 2003, Wingender et al, 2004, and Berry et al., 2006). Many problems in drinking water distribution systems are microbial in nature, from biofilm growth to water nitrification, corrosion, and persistence of pathogens (Camper et al., 2004, Emtiazi et al., 2004, Regan et al., 2003, and Beech et al., 2004). Although most of the microorganisms found in drinking water distribution systems belong to autochthonous aquatic microflora (Bagh et al., 2004), which are considered to be harmless, many studies have shown that drinking water biofilms can harbor opportunistic pathogens harmful to humans (Flemming et al., 2002, Szewzyk et al., 2000, and LeChavallier et al., 1996).

Many waterborne pathogens are known to persist and reproduce in drinking water distribution systems and are responsible for causing infections of the gastrointestinal tract, skin, and lymph nodes. *Legionella pneumophila, Pseudomonas aeruginosa, Aeromonas* sp., and *Mycobacterium* sp. are among the pathogens found in tap water in homes, public buildings, and hospitals (Stojek et al., 2008, Armon et al., 1997, Moritz et al., 2010, Sen et al., 2004, Mazari-Hiriart et al., 2005, Kunimoto et al., 2003, and Dailloux et al., 2003). The situation is aggravated by the growing occurrence of antibiotic resistant genes in drinking water biofilms responsible for vancomycin-resistance (vanA) and beta-lactamase activities (Schwartz et al., 2003). Furthermore, many bacteria can transform into ultramicrocells (Silbaq et al., 2009) or enter into a viable but nonculturable state in response to environmental stress, making surveillance and detection difficult (Oliver et al., 2005).

Microorganisms can colonize and form complex microbial ecosystems on all surfaces of drinking water distribution systems that are in contact with water (Vaerewijck et al., 2005). The age, construction, and materials of the water distribution system affect biofilm formation and dynamics (Lautenschlager et al., 2010, Bolton et al., 2010, and Moritz et al., 2010). It has been shown that the diverse microbial community found in drinking water systems can increase microbial resistance to chemical disinfection. Studies have clearly demonstrated that maintaining a residual level of chemical disinfectant in drinking water distribution system is ineffective in controlling microbial growth (Servais et al., 1995, Kilb et al., 2003, Wingender et al., 2004, and Berry et al., 2006).

Higher chlorination combined with frequent flushing is shown to alleviate, but not completely solve, the microbial problem (Besner et al., 2008). However, chlorination can produce unwanted byproducts such as chloromethane with its own health implications (Sohn et al., 2004). The same issue exists with ozone treatment because it produces byproducts, wherein both the byproducts and the ozone itself have adverse health effects. (Galapate et al., 2001).

UV disinfection at the point-of-use has been proposed (Cristea et al., 2009), but at a significantly higher cost. Furthermore, turbidity from gas bubbles can significantly reduce its effectiveness (Sommer et al., 2000). Also, cellular repair mechanisms limit its efficiency, as shown by a study that reports Gram-negative Enterobacteriaceae (i.e., coliforms and enterococci) exhibit a high rate of regrowth after UV disinfection (Sommer et al., 2000). UV irradiation can also induce competence in *Legionella pneumophila*, allowing the bacteria to acquire and propagate foreign genes, contributing to its emergence as a pathogen (Charpentier et al., 2011).

Because contamination can occur throughout water distribution systems, an extra disinfection step can be considered as a final barrier. Point-of-use treatment (POU) devices are considered small water treatment systems for household and domestic usage. The devices are designed for direct consumption located at a single tap or a limited tap (EPA, 2006). Many POU devices have been studied and widely used for years. Most of these devices are made of hollow fibers with activated carbon to trap or adsorb microorganisms based on membrane filtration and adsorption. However, a trapped or adsorbed microorganism may still survive. The point-of-use water filters are reported to be effective in reducing *Legionella pneumophila* and *Mycobacterium* in water fixtures (Sheffer et al., 2005), but a more recent study showed water filters to be vulnerable to microbial colonization (Chaidez et al., 2004). Heterotrophic plate count (HPC) bacteria, faecal coliforms, and acid-fast organisms (*Mycobacteria* spp.), as well as opportunistic pathogens such as *Aeromonas hydrophila, Plesiomonas shigelloides,* and *Pseudomonas aeruginosa,* are reported to thrive in filtered water samples. The study concluded that many of the point-of-use filter devices may amplify the number of bacteria present in the tap water by promoting biofilm growth. Furthermore, current filtration technology cannot treat ultramicrocells in drinking water (Silbaq et al., 2009).

Although other POU devices based on disinfection by chlorination or UV radiation have been developed, they are expensive and may produce unpleasant tastes, odors, and DBPs in water (for chlorination). Performance is also affected by the presence of particles leading to, for example, hardness, turbidity, and metal content in water (for UV radiation). Also, the lifetimes of the POU devices are very limited. Advanced treatment is needed to reduce survivability of pathogens. In this regard, while PEF treatment has been used for water disinfection (Espino-Cortes et al., 2006, Uchida et al., 2008, Riedel et al., 2008, and Duda et al., 2011), it is typically unsuitable for POU disinfection of drinking water.

Pulsed electric field (PEF) systems inactivate microorganisms by electroporation of the cellular membrane when an external electric field is applied (Sale et al., 1967 and Timoshkin et al., 2004). The accumulation of charges on the cell membrane eventually develops into a transmembrane potential that increases cell permeability, and in severe cases, leads to an irreversible breakdown of the cell. In particular, PEF inactivates microorganisms by causing dielectric breakdown of a cell membrane. The exposure of biological cells to an electric field causes polarization of bilayers of phospholipid cell membrane because of the ion movement on the membrane. Ions accumulate on the membrane surface and generate a transmembrane potential (Barbosa-Canavas et al., 1998). When the transmembrane potential is greater than the natural potential of the cell or the applied electric field is greater than the critical electric field, electropermeabilization can be observed, such as rapid increase of membrane permeability and membrane rupture, or dielectric breakdown (Weaver et al., 1996). The breakdown can be reversible or irreversible, depending on the electric field intensity and duration of the applied electric field. The irreversible loss of membrane semipermeable function results in cell death. The breakdown can be applied to inactivation of microorganisms such as bacteria, yeasts, and viruses (Jayatam et al, 1991).

PEF is also an alternative non-thermal food preservation technology to control microbial content in food. The technology was first used for non-thermal sterilization pharmaceuticals (Goldberg et al., 2009) and food products (e.g., fruit juices, beer, milk and cream) (Rastogi et al., 2003 and Wan et al., 2009). Traditionally, thermal treatment was used to treat food and beverages with temperature of 60-100° C. for a few seconds to minutes, and a high energy supply was needed to hold treatment plants at a high temperature. The high temperature may flavor unwanted changes or degradation of food. For example, thermal-processed milk loses protein, vitamins, and other nutrients (Barbosa-Canavas et al., 2004). To maintain a high quality of food, the nutrient contents are aimed to be kept the same, with low or no microbial content.

In general, PEF can be applied to inactivate a variety of microorganisms. Yeast in a larger-size is more sensitive than bacteria to PEF treatment (Barbosa-Canavas et al., 2004), and gram-negative bacteria (e.g., *Escherichia coli* or *Pseudomonas aeruginosa*) are more sensitive than gram-positive bacteria (e.g., *Staphylococcus aureus* or *Enterococcus faecium*) (Min et al., 2007), likely because gram-positive cells have a thick cell wall of several layers of peptidoglycan, while gram-negative cells only have a thin middle membrane (Qin et al., 1994). PEF treatment also sterilizes bacterial spores and mold ascospores (Marquez et al., 1997 and Choi et al., 2008).

Electroporation is reported to occur at a transmembrane potential of 0.5 V and cell lysis near 1.5 V (Fox et al., 2005). Even sub-lethal injuries caused by PEF treatment are reported to render the microorganism nonviable within an hour of the treatment (Garcia et al., 2005). Reports also suggest PEF can decrease the activity of various enzymes, including lipase, glucose oxidase, amylase, peroxidase, and polyphenol oxidase (Ho et al., 1997), and could explain the observed change in the respiratory activity of PEF-treated bacteria (Podolska et al., 2009). Unlike thermal and UV treatment, PEF treatment does not induce competence in bacteria population (Riedel et al., 2008).

A number of PEF systems operating at high voltages have been used for microbial disinfections (U.S. Pat. Nos. 6,379,628, 6,083,544, 7,059,269, 6,746,613, and U.S. Patent Application Publication No. 2010/0112151). Although these devices show promising antimicrobial performance, they are unsuitable for POU disinfection of drinking water from the tap, due to the high voltage needed to operate effectively.

Furthermore, PEF systems are subject to electrode corrosion. Because of the electric field and aqueous environment, electrodes inside the PEF system will corrode gradually and reduce the performance of the disinfection. Thus, there is a need for new materials for electrodes to provide increased corrosion resistance for use in PEF systems, wherein the electrodes are substantially non-reactive and resistant to corrosion.

Metals are highly susceptible to oxidation and corrosion in aggressive environments, but are widely used because of superior properties like chemical stability, high microindentation hardness, wear resistance at high temperature, low cost, stiffness, and high strength to weight ratios. For example, aluminum and steel alloys are used in a myriad of structural, marine, and aircraft applications. Metal corrosion is a universal problem that affects environments through chemical change that can results in failure of structures and operating equipment, which is very costly and results in human injuries (Schweitzer, 2010). Metal corrosion is a serious problem costing an industrialized country several percent of its Gross Domestic Product (Newman et al., 1994). Studies reported that one-fifth of energy globally and an average of 4.2% of Gross National Product yearly is lost due to corrosion, with the economic impact of corrosion estimated to be approximately $100 billion per year in the USA and around € 200 billion in Europe (Wang et al., 2009). This cost includes the application of protective coatings (paint, surface treatment, etc.), inspection and repair of corroded surfaces and structures, and disposal of hazardous waste materials (Metroke et al., 2001).

Conducting electrodes made of metals, metal alloys, carbon, graphite (including graphene and other exotic carbons), semiconductors, and conducting polymers are widely used in electrochemical application, such as for electrolysis, fuel cells, electroplating, etc. Protection of electrodes is important in these applications, as corrosion of the electrodes may occur.

When the anode has a lower electrical potential compared to the anions present in water or water solutions, the anode metal is oxidized and experiences a sacrificial weight loss during the electrochemical reaction. The level of weight loss for the anode is largely dependent on the specific electrode material, operating temperature, and amount of electrical current passing through the electrode surface. Electricity utilizes ionic species (electrolytes) in the water to travel, therefore the higher the concentration of ions in solution, the further and quicker electricity can travel through the water medium to attack the anode.

Although inert electrodes, such as platinum metal, nickel metal, and stainless steel with high concentration of nickel, have greater corrosion ability in caustic environments, they are usually expensive. Thus, a need exists for new strategies to increase corrosion resistant in electrode. As such, methods have been investigated to protect the metals from corrosion, including anodizing, electroless plating, polymer/organic coatings, and conversion coating (Lin et al., 2006, Zhang et al., 2008, Song et al., 2008, Prosek et al., 2008, and Kim et al., 2007).

Zeolites are a class of microporous crystalline aluminosilicate based on a 3D network of oxygen ions. They are constructed from $AlO_4$ and $SiO_4$ tetrahedra linked to each other by sharing oxygen ions. They have unique properties which enable them to be used in diverse applications, mainly as catalysts, ion exchangers, and adsorbents. Support materials coated by zeolites may serve as sensors (Mintova et al., 2001), membranes in separation process (Jareman et al., 2005), structured catalysts in reactors (Yuranov et al., 2005), and adsorbents in adsorption heat pumps (Tatlier et al., 1999). Pure zeolite films were also demonstrated to be a promising alternative as ultralow-k dielectrics for future generation computer chips (Wang et al., 2001a and Wang et al., 2001b).

Recent literature reported use of zeolites to coat metal surfaces such as aluminum alloy, stainless steel, mild steel, etc. A synthesized zeolite coating on various aluminum alloys (AA2024-T3, AA5052-H32, AA6061-T4, and AA7075-T6) by an in situ crystallization method was reported (Cheng et al., 2001 and Beving et al., 2006). It was reported that an in situ crystallization method developed uniform and dense zeolite coatings and significantly improved the corrosion resistance of the aluminum alloys in various acidic, neutral, and basic electrolytes. Zeolite coating by in situ crystallization on stainless steel 304 used as condensers in spacecraft was also synthesized (McDonnel et al., 2005). Zeolite coatings by the incorporation of zeolite powders in a sol-gel matrix have been synthesized, and in these studies, the corrosion resistance of the zeolite coated aluminum alloys is marginally higher than the sol-gel matrix coated alloy (Calabrese et al., 2012 and Dias et al., 2013). Zeolite powder was pressed on an adhesive-coated mild steel, and the corrosion resistance of the coated alloy in the presence of various organic acids, such as acetic acid, formic acid, and citric acid, was examined (Katariya et al., 2013). It was concluded that presence of the zeolite coating plays an important role in preventing aggressive H+ ions from attacking the mild steel substrates and thus provides improvement in the corrosion resistance of the alloy. It was also reported that zeolite coating developed on the AA2024-T3 aluminum alloy via isothermal synthesis provided excellent barrier properties to the alloy in 0.1 M NaCl solution (Cai et al., 2008). Due to its inert nature and impermeability, zeolite coating could be an alternative environmentally friendly coating for electrodes, especially for water electrolysis and PEF systems, which have caustic environments toward electrodes.

SUMMARY

In an embodiment, the present subject matter relates to a device for point-of-use disinfection of water comprising a plurality of micro-engineered electrodes having a micro-gap between the micro-engineered electrodes; a power supply; a control system; and a low-voltage pulsed electric field generator circuit responsive to the control system, to generate a pulsed electric field strength across the micro-gap of the micro-engineered electrodes, thereby providing the pulsed electric field strength at a level effective to increase cell permeability and/or cause an irreversible damage to the cell of microorganisms present in the water.

In an embodiment, the present subject matter relates to a method for point-of-use disinfection of water comprising providing a plurality of micro-engineered electrodes having a micro-gap between the micro-engineered electrodes that is maintained by a thin physical separator that can separate solid, suspended, and dissolved pollutants from water, and generating a pulsed electric field across the thin physical separator to provide a pulsed electric field strength at a level effective to increase cell permeability and/or cause irreversible damage to cells of microorganisms present in the water.

In an embodiment, the present subject matter relates to an assembly for a device for point-of-use pulsed electric field (PEF) disinfection of water comprising a thin physical separator; and a plurality of micro-engineered electrodes having a micro-gap between the micro-engineered electrodes. In an embodiment, the present subject matter relates to the assembly wherein an "origami" method is used, allowing a large electrode area to be folded into a compact space and volume. In an embodiment, the thin physical separator is porous and permeable to water and is selected from the group consisting of water filters, filtration membranes, (e.g., microfiltration membranes, ultrafiltration membranes, nanofiltration membranes, and reverse osmosis membranes), ion-exchangers, adsorbers (e.g., activated carbon and activated carbon cloths), and combinations thereof, thus allowing not only disinfection of microorganisms from drinking water, but also purification of drinking water from unwanted solids and other suspended and dissolved pollutants affecting water quality.

In an embodiment, the present subject matter relates to a process for improving corrosion resistance of a conducting electrode for pulsed electric field (PEF) system disinfection, the process comprising: (a) coating zeolites, zeotypes, or molecular sieves on a conducting electrode substrate to obtain a conducting electrode; and (b) PEF disinfection comprising the conducting electrode, wherein the conducting electrode has a higher corrosion resistance than an uncoated electrode.

In an embodiment, the present subject matter relates to a PEF disinfection system for drinking water disinfection, comprising: a pulsed electric field generator to generate a pulsed electric field across a conducting electrode, the pulsed electric field having a strength at a level effective to cause damage to cells of microorganisms present in water; and a set of electrodes formed of a zeolite coated electrode, wherein the zeolite coated electrode has a higher corrosion resistance than an uncoated electrode.

In an embodiment, the present subject matter relates to a PEF assembly for point-of-use disinfection of water, the PEF assembly comprising: a plurality of electrodes making up an anode and a cathode formed of zeolite-coated electrodes; and a physical separator that is a thin filter, membrane, ion-exchanger, absorber, or combinations thereof, wherein the separator separates and removes unwanted solid, suspended, and dissolved pollutants in water.

BRIEF DESCRIPTION OF DRAWINGS

FIG. 24 is a plot of the decrease in viable *E. coli* at the outlet of the POU device when the PEF function is off (i.e., microfiltration of bacteria) and when the PEF is turned on.

FIG. 26 is a plot of the viable *E. coli* bacteria at the inlet and outlet of the POU device. The inset reports the number of viable bacteria recovered from the surface of the microfiltration membrane when the PEF was turned off and on.

FIG. 28 is a plot of the viable bacteria at the inlet and outlet of the POU device in the hospital field test. The inset reports the number of viable bacteria recovered from the surface of the microfiltration membrane when the PEF was turned off and on.

FIG. 31 is a plot of the viable bacteria at the inlet and outlet of the POU device in the treatment of raw surface water. The inset reports the number of viable bacteria recovered from the surface of the microfiltration membrane when the PEF was turned off and on.

DETAILED DESCRIPTION

Definitions

Figure 1:
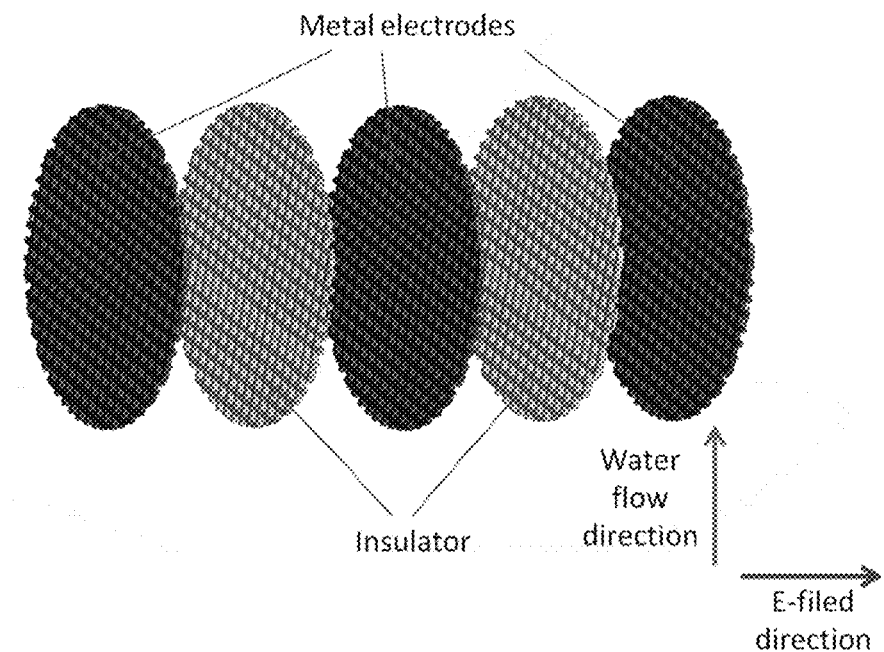
FIG. 1 is a schematic diagram showing a micro-engineered porous electrode system with the installation showing water flow direction perpendicular to the electric (E-) field direction.

The following definitions are provided for the purpose of understanding the present subject matter and for constructing the appended patent claims.

As used herein, "disinfection" is defined as at least 90% reduction of the number of microorganisms (e.g., the number of colony forming units (CFU) of bacteria) in a sample of treated or produced water. The disinfection of microorganisms is generally achieved by application of an electric field to the cell wall of microorganisms captured within the electric field. The electric field induces an increase in cell permeability (e.g., pore formation) of the cell wall of the microorganism, and thus causes irreversible damage to the microorganism through a combination of cell wall collapse, osmotic stress, and enhanced transport of residual disinfectants (e.g., chlorine) in water.

As used herein, a "multi-rod electrode" refers to a plurality of rod-shaped electrodes.

It is noted that, as used in this specification and the appended claims, the singular forms "a", "an", and "the" include plural references unless the context clearly dictates otherwise.

Unless defined otherwise, all technical and scientific terms used herein have the same meaning as commonly understood to one of ordinary skill in the art to which the presently described subject matter pertains.

Where a range of values is provided (e.g., concentration ranges, percentage ranges, or ratio ranges), it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Abbreviations
AC alternating current
CDC Center for Disease Control and Prevention
CFU colony forming units
DBP disinfection byproducts
DC direct current
DDI double deionized
*E. coli* Escherichia coli
EPA Environmental Protection Agency
HPC heterotrophic plate count
PEF pulsed electric field
POU point-of-use
SDA structure directing agent
TCR total coliform rule
TEOS tetraethyl orthosilicate
TEOT tetraethyl orthotitanate
TPA tetraproylammonium
TPAOH tetrapropylammonium hydroxide
TTHM total trihalomethane
UV ultraviolet
$VOSO_4$ vanadyl sulfate salt Pulsed Electric Field Device for Drinking Water Disinfection Described herein is a novel micro-mini pulsed electric field device (also called a micro-engineered pulsed electric field device) for disinfection of drinking water comprising a low voltage pulsed electric field generator circuit and micro-engineered electrodes to disinfect microorganisms found in drinking water (Examples 1-13). An advantage of the present device is that disinfection is achieved while avoiding the excessive use of chemical disinfectants and biocides that could potentially induce resistance and tolerance in microorganisms and possibly alter the taste and quality of the drinking water. The device can be applied not only in a domestic situation, but also in public, commercial, and industrial premises where safe drinking water is paramount.

The present disclosure is directed to a point-of-use drinking water disinfection device. The various designs described herein are merely non-limiting examples. It is contemplated that other such designs can be created using design software (e.g., SolidWorks and AutoCAD) and can be manufactured by a general industrial process.

Figure 13:
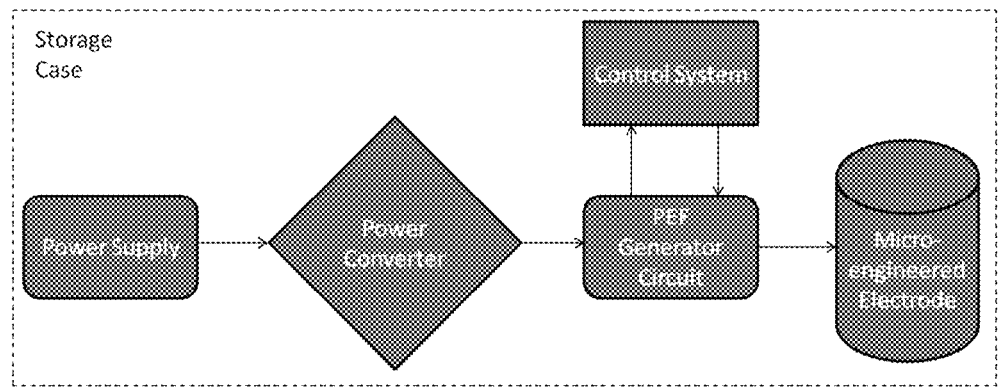
FIG. 13 is a schematic diagram showing a typical device for point-of-use disinfection of water according to the present disclosure.

A typical device for point-of-use disinfection of water according to the present subject matter comprises at least a low voltage pulsed electric field generator circuit, micro-engineered electrodes, control system, power supply, and a storage case. The device may further comprise a power converter. A schematic diagram of a non-limiting, exemplary device is shown in FIG. 13. According to FIG. 13, briefly, AC is the preferred power supply and may come from a building electrical outlet or be generated by dynamo or wind turbine or similar devices that produce AC electricity. When AC power passes through the converter unit, it is converted into DC power, which can power the PEF generator circuit. The control system is used to control the ON/OFF of the pulse generated by the PEF generator circuit, which is then transmitted to the micro-engineered electrode.

Figure 14:
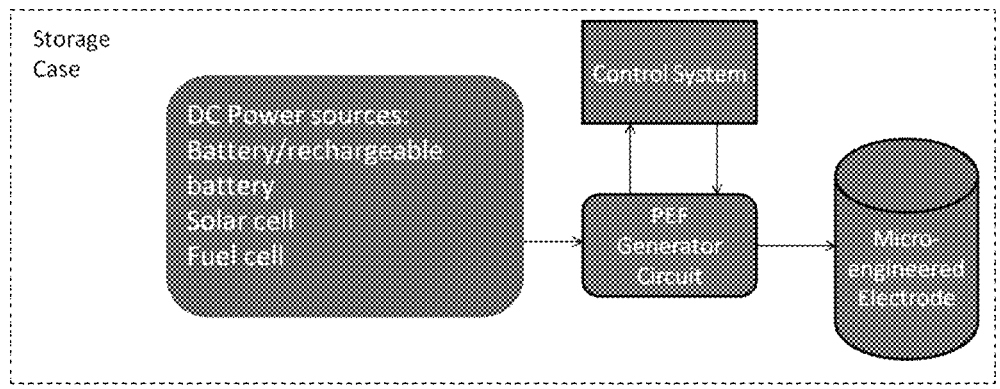
FIG. 14 is a schematic diagram showing a typical device for point-of-use disinfection of water according to the present disclosure using DC electrical power sources such as battery and rechargeable battery, solar cell, and fuel cell units.

Alternatively, the device for point-of-use disinfection of water according to the present subject matter comprises at least a low voltage pulsed electric field generator circuit, micro-engineered electrodes, control system, power supply, and a storage case. A schematic diagram of a non-limiting, exemplary device is shown in FIG. 14. According to FIG. 14, the device may use battery or other energy storage or electricity generating devices (e.g., solar cell or fuel cell) to supply DC electricity to power the PEF generator circuit. The control system is used to control the ON/OFF of the pulse generated by the PEF generator circuit, which is then transmitted to the micro-engineered electrode.

The device can be a stand-alone unit or a tap-mounted unit for point-of-use disinfection of drinking water or as a component in a water purification appliance. A typical stand-alone device has dimensions ranging from 100 mm×100 mm×100 mm to 300 mm×300 mm×300 mm, but can be smaller or larger depending on the characteristics of the device. A tap-mounted unit can have dimensions ranging from 3 mm×3 mm×3 mm to 80 mm×80 mm×80 mm, but can be smaller or larger depending on the characteristics of the device. As a component in a water purification appliance, the size of the unit will depend on the characteristics of the device, but will be normally within the dimension of the tap-mounted unit or smaller.

An embodiment of the present subject matter is directed to a stand-alone unit or a tap-mounted unit for use outside of homes with an internal rechargeable battery unit to be powered by a portable battery, a DC outlet in automobiles, a wind turbine, a photovoltaic solar cell, a water or a hand-cranked dynamo, or similar devices that generate electricity.

An embodiment of the present subject matter is directed to a tap-mounted unit with an internal rechargeable battery unit to be powered by a dynamo located in the drain through which water is flowing.

Micro-Engineered Electrode System

A micro-engineered electrode system (also referred to as a mini-micro electrode system) is designed to generate an intense electric field at low voltage. The electrodes are made of a conducting material. Conducting materials of which the electrodes may be made include, as non-limiting examples, metals and metal alloys such as stainless steel, aluminum and aluminum alloys, titanium and titanium alloys, copper and copper alloys (e.g., brass), tungsten and tungsten alloys, conducting ceramic, glasses and intermetallics including their composites such as a metal-metal alloy composite, and coatings thereof. A metal-metal alloy composite can be any combination/mixture of metals (e.g., Fe(Iron)-Al(Aluminium)). The electrodes may be comprised of carbon-based materials, including the non-limiting examples of conducting polymers, carbons, graphite, graphene and carbon nanotubes, including composites and coatings thereof. A carbon-based material composite can be a combination/mixture of the above carbon-based materials (e.g., mixtures of graphene with graphite, or graphene with carbon nanotubes). Such a carbon-based material composite may also be applied as a coating.

A micro-gap having a dimension ranging from about 10 μm up to about 300 μm, or from about 50 μm to about 150 μm, is maintained between the electrodes. A physical separation between the microelectrodes is achieved by (a) use of a physical barrier optionally, but not restricted to, insulating materials such as acrylonitrile butadiene styrene, poly(m- ethyl methacrylate), poly(vinyl chloride), polycarbonate, polyphenylsulfone polymer, and similar polymer materials; (b) use of a non-electrical conducting protective layer on metal electrodes by electrophoretic deposition, for example by electropolymerization, anodization, and electrocoating (e-coating) process; and/or (c) use of microfabrication technology in electrode manufacture to systematically locate and position the electrodes on a solid substrate. A person of skill in the art would readily appreciate what microfabrication techniques are used in the fabrication of electronic devices. Typically, microfabrication techniques involve chemical deposition, photoresist coating, photolithography, patterning, and etching.

In terms of the installation of the electrode system within the device, the electrode system could be installed such that the direction of the electric field generated is either perpendicular or parallel to the water flow or at intermediate angles in between.

Low-Voltage Pulsed Electric Field Circuit

A low-voltage pulsed electric field generator with a voltage input of less than about 30 V, in particular between about 5 V up to about 20 V, is designed to generate a pulsed electric field strength of at least about 0.5 kV/cm to about 20 kV/cm, for example, about 3 kV/cm to about 10 kV/cm. This range of electric field intensity can effectively disinfect drinking water from the tap. The pulsed electric field generator circuit is comprised primarily of electrical components including, but not limited to, resistors, capacitors, amplifier, logic gate and IC chips, etc. The pulsed electric field generated from the circuit can be simulated by computer software before actual fabrication. The pulsed electric field generated from the circuit has a pulsed waveform, which could be square, sinusoidal, trapezoidal, triangular, etc.

Performance of Micro-Mini Pulsed Electric Field Device

Performance of the micro-mini pulsed electric field device was evaluated, as discussed below with respect to Examples 12 and 13. Tap water containing a known concentration of *E. coli* was contacted with the different micro-engineered electrode systems in various operating conditions, such as different pulse width, pulse frequency, waveform, pulse strength, and pulse duration. The low-voltage pulsed electric field circuit generated the pulse and passed to the electrode system for electric field generation. The anti-microbial efficiency was then calculated in terms of percentage by counting the *E. coli* remaining after the disinfection process.

Zeolite Coated Electrode for Electrochemical Application

The present subject matter relates to an effective, anti-corrosion zeolite coating on a conducting electrode substrate. The zeolite coated electrode with improved anti-corrosion properties can be used for electrochemical applications such as water electrolysis and a PEF system without altering the performance. A process for improving corrosion resistance of electrodes using such a coating comprises immersing the electrodes into a zeolite synthesis solution to have a coating on the electrode surface prior to using the electrodes in a water electrolysis and/or PEF system. The zeolite coating may consist of zeolites, molecular sieves, and/or zeotypes.

Zeolite Coated Electrode

A zeolite coated electrode is formed by coating zeolite, zeotype, and/or molecular sieve material on a conducting electrode such as a metal, metal alloy, carbon, graphite, semiconductor, or a conducting polymer. In an example, the zeolite, zeotype, and/or molecular sieve is coated uniformly on the surface of the conducting electrode substrate. The conducting electrode having the zeolite, zeotype and/or molecular sieve coated limits the corrosion because of the protection from the zeolite coating. This coated electrode can be used in the water electrolysis and PEF systems without affecting their performance. Methods to prepare the zeolite, zeotytpe, and molecular sieves coated electrode include the (a) direct hydrothermal synthesis method, (b) seeding and regrowth method, and (c) surface grafting and dip-coating method, as described in Examples 14-24.

In an embodiment, the present subject matter is directed to a process for improving corrosion resistance of a conducting electrode for water electrolysis and pulsed electric field (PEF) system disinfection, the process comprising: (a) coating zeolites, zeotypes, or molecular sieves on a conducting electrode substrate to obtain a conducting electrode; (b) water electrolyzing an aqueous solution comprising the conducting electrode, wherein the conducting electrode has a higher corrosion resistance than an uncoated electrode; and (c) PEF disinfection comprising the conducting electrode, wherein the conducting electrode has a higher corrosion resistance than an uncoated electrode.

In an embodiment, the conducting electrode substrate of the present subject matter is made of a material selected from the group consisting of metals, metal alloys, carbon, graphite, semiconductors, and conducting polymers.

In an embodiment, the zeolites, zeotypes, or molecular sieves of the present subject matter comprise a material selected from the group consisting of small pore zeolites, medium pore zeolites, large pore zeolites, extra-large pore molecular sieves, and mesoporous molecular sieves.

In an embodiment, the zeolites of the present subject matter are selected from the group consisting of LTA, MFI, and FAU.

In an embodiment, the molecular sieves of the present subject matter are selected from the group consisting of mesoporous silica and extra-large pore molecular sieves.

In an embodiment, the zeolites, zeotypes, or molecular sieves of the present subject matter coated on the conducting electrode substrate are aggregate particles or film particles.

In an embodiment, the coating step (a) of the present subject matter further comprises direct synthesis, seeding and regrowth, surface grafting, and dip-coating.

Zeolite Coated Electrode in Electrochemical Application

A zeolite coated electrode was used in electrochemical application and the performance was evaluated, as discussed with respect to Examples 25 and 26. A Silicalite-1 zeolite coated electrode was used as an electrode in water electrolysis (Example 25), and a Silicalite-1 zeolite coated electrode was used as the electrode in the PEF system for drinking water disinfection (Example 26).

In an embodiment, the present subject matter is directed to a water electrolysis cell for hydrogen generation, comprising: a cathode and an anode formed of a zeolite coated electrode, wherein the zeolite coated electrode has a higher corrosion resistance than an uncoated electrode; and an electrolyte intermediate of the anode and the cathode.

In an embodiment, the zeolite coated electrode of the present subject matter is a Silicalite-1 zeolite coated electrode.

In an embodiment, the present subject matter is directed to a PEF disinfection system for drinking water disinfection, comprising: a pulsed electric field generator to generate a pulsed electric field across a conducting electrode, the pulsed electric field having a strength at a level effective to cause damage to cells of microorganisms present in water; and a set of electrodes formed of a zeolite coated electrode, wherein the zeolite coated electrode has a higher corrosion resistance than an uncoated electrode.

In an embodiment, the zeolite coated electrode of the present subject matter is a Silicalite-1 zeolite coated electrode.

In an embodiment, the pulsed electric field of the present subject matter further comprises a voltage input of 90 V (i.e. electric field density=90 kV/cm), a pulse width of 2 ms, and a pulse frequency of 100 Hz.

Pulsed Electric Field Assembly with Separator for Interlayer Spacer

The present subject matter relates to an effective, environmentally benign, safe device for point-of-use disinfection of drinking water from the tap by subjecting microorganisms in water under an intense pulsating electric field generated across the space between the electrodes, wherein the space is separated by a separator. Microorganisms in the water are captured, stressed, and/or rendered by causing irreversible damage through one or more of cell wall collapse, osmosis stress, and enhanced transport of residual disinfectant. Thereby, disinfection is achieved under the pulsed electric field.

Pulsed Electric Field (PEF) Assembly

A typical pulsed electric field assembly is composed of at least a pair of electrodes and a separator, with respect to Examples 27-30. A separator in this assembly is anything having a separating function, preferably but not limited to a membrane or filter. Electrodes are made of conducting materials preferably but not limited to metals and metal alloys such as stainless steel, aluminum and aluminum alloys, titanium and titanium alloys, copper and copper alloys and tungsten and tungsten alloy, including composites and coatings thereof. The electrodes could also be made of other materials, including but not limited to carbon-based materials including conducting polymers, carbons, graphite, graphene, and carbon nanotubes, including composites and coatings thereof. The electrodes could also be made of other materials, including but not limited to conducting ceramic, glasses, and intermetallics, including composites and coatings thereof. The assembly can be a stand-alone unit or a tap mounted unit for point-of-use disinfection of drinking water. A typical stand-alone assembly has dimensions smaller than 300 mm×300 mm×300 mm, and a tap-mounted assembly is preferably smaller than 80 mm×80 mm×80 mm.

In an embodiment, the present subject matter is directed to a PEF assembly for point-of-use disinfection of water, the PEF assembly comprising: a plurality of electrodes making up an anode and a cathode; and a separator.

In an embodiment, the PEF assembly of the present subject matter is a stand-alone unit or a tap-mounted unit.

In an embodiment, the plurality of electrodes of the present subject matter are comprised of a conducting material selected from the group consisting of carbon-based materials, ceramics, glasses, intermetallics, composites, and coatings.

In an embodiment, the separator of the present subject matter comprises a material having a separating function. In an embodiment, the separator is a porous filter, water filtration membrane such as microfiltration, ultrafiltration, nanofiltration, and reverse osmosis membrane, ion-exchange resin, activated carbon layer, and cloth or paper that can physically or chemically separate pollutants from water.

In an embodiment, the PEF assembly further comprises: a porous electrode; nano-electronic printed electrodes; and a conducting rod.

In an embodiment, the porous electrode of the present subject matter is made of a material selected from the group consisting of metals and alloys, conducting carbons, polymers, ceramics, intermetallics, composites, and coatings. In an embodiment, the metals and alloys are selected from the group consisting of stainless steel, aluminum, brass, titanium, and tungsten.

In an embodiment, the porous electrode of the present subject matter comprises a material having a through porosity selected from the group consisting of mesh, screens, perforated plates and foils, porous plates and foils, fabrics, papers, and micropatterned foils.

In an embodiment, the nano-electronic printed electrodes of the present subject matter are made by printing an electrode pattern on a flexible substrate. In an embodiment, the flexible substrate of the present subject matter is made of a material selected from the group consisting of plastics, fabrics, and insulated metal foils.

In an embodiment, the electrode pattern of the present subject matter is printed on both sides of the flexible substrate, wherein a first side comprises positive electrodes and a second side comprises negative electrodes.

In an embodiment, the electrode pattern of the present subject matter consists of a parallel pattern of positive electrodes and negative electrodes, wherein the pattern is printed on both surfaces of the flexible substrate.

In an embodiment, the nano-electronic printed electrodes of the present subject matter comprise materials selected from the group consisting of metals and alloys, conducting carbons, polymers, ceramics, intermetallics, composites, and coatings. In an embodiment, the metals and alloys are selected from the group consisting of stainless steel, aluminum, brass, titanium, and tungsten.

In an embodiment, the conducting rod of the present subject matter is made of a material selected from the group consisting of metals and alloys, conducting carbons, polymers, ceramics, intermetallics, composites, and coatings. In an embodiment, the metals and alloys are selected from the group consisting of stainless steel, aluminum, brass, titanium, and tungsten.

In an embodiment, the conducting rod of the present subject matter is a perforated rod, having the shape of a rod having holes.

Performance of PEF Assembly

Performance of the PEF assembly is evaluated and described in Examples 31 and 32. A laboratory setup for a PEF system included a PEF generator, PEF assembly, a pump, a beaker with approximately 500 volume containing bacteria contaminated tap water ($10^4$ CFU/ml of *E. coli*) and a stirring plate. The PEF generator sets various operating conditions, such as different pulse width, pulse frequency, waveform, and pulse strength. The anti-microbial efficiency is then calculated in terms of percentage by counting the E. coli remaining after the disinfection process.

In an embodiment, the PEF assembly of the present subject matter reduces 99% of *Escherichia coli* ($10^4$ CFU/ml initial concentration) in a pulsed electric field comprising an intensity of 9 kV/cm, a frequency of 100 Hz, and a width of 2000 μs.

In an embodiment, the PEF assembly of the present subject matter reduces 99% of *Escherichia coli* ($10^4$ CFU/ml initial concentration) in a pulsed electric field comprising an intensity of 10 kV/cm, a frequency of 100 Hz, and a width of 1000 μs.

EXAMPLES

Example 1

Micro-Engineered Porous Electrode System
(Design 1, Perpendicular Electric Field)

FIG. 1 is a non-limiting schematic diagram showing a micro-engineered porous electrode system (Design 1). The system is installed so that the direction of the electric field is perpendicular to the direction of tap water flow. The electrodes in this non-limiting example are in the form of a mesh, but it is also contemplated that the electrodes could be in the form of a screen, perforated plates or foils, porous plates and foils, fabrics, papers, micropatterned foils, or any materials containing through porosity. Mesh size is defined as the number of squares in one inch horizontally and vertically. Mesh sizes ranging from about 20 mesh to about 200 mesh are suitable. In certain embodiments the mesh size is 40 mesh, 50 mesh, or 100 mesh. The electrode materials in this non-limiting example are metals or their alloys, particularly stainless steel, aluminum, brass, titanium, and/or tungsten. It is also contemplated that the electrode materials could be conducting carbons, polymers, ceramics, and intermetallics, including composites and coatings thereof.

A porous barrier made of insulating material with a maximum thickness of 100 µm is used to create a micro-gap between the electrodes as shown in FIG. 1. In the alternative, the barrier could be a non-electrical conducting protective layer of less than 100 µm deposited on the electrode surface by electrophoretic deposition process (e.g., anodization or E-coating), depending on the electrode material, so that the physical barrier could be omitted. The micro-engineered porous electrodes can have a minimum of two electrodes with or without a separator, but more electrode-separator pairs are contemplated. The number of electrode-separator pairs is constrained mainly by the optimal overall thickness of 10 mm and water pressure drop of not more than 10%. An example of micro-engineered electrodes comprises up to 20 electrode-separator layers with a diameter of 10 mm and a thickness of 10 mm.

Example 2

Micro-Engineered Multi-Rod Electrode System
(Design 2, Perpendicular Electric Field)

Figure 2:
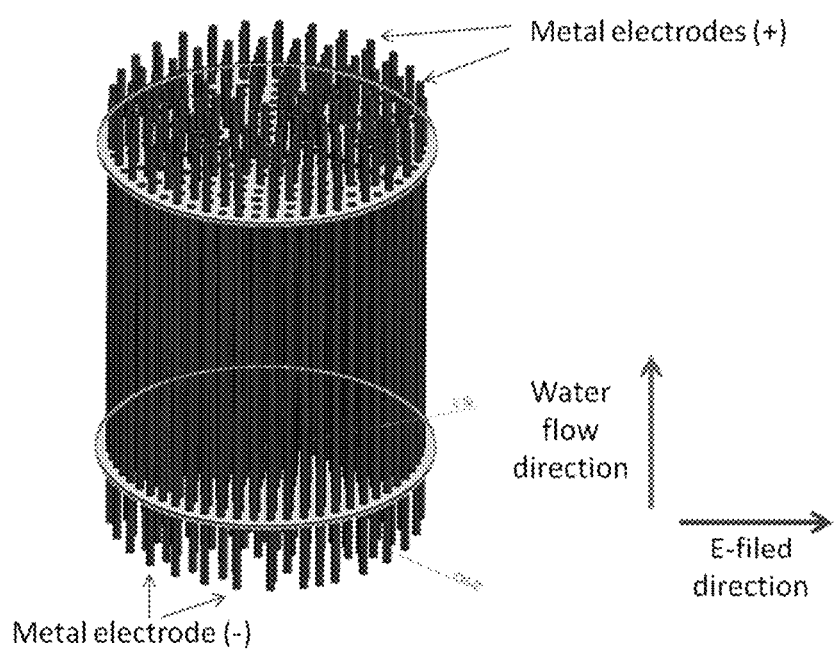
FIG. 2 is a schematic diagram showing a micro-engineered multi-rod electrode system with the installation showing water flow direction perpendicular to the E-field direction.

FIG. 2 is a non-limiting schematic diagram showing a micro-engineered multi-rod electrode system (Design 2). The system is installed such that the direction of the electric field is perpendicular to the direction of tap water flow. The electrodes are in the shape of rods with a diameter of 300 µm, but could also be thinner or thicker depending on the mechanical properties of the materials.

The electrodes could also be in the form of twisted wires, hollow rods, flat plates, and rods of different cross-sectional materials, including but not limited to, angular shapes with the purpose of creating intense electrical fields. The electrode materials in this non-limiting example are metals or their alloys, particularly stainless steel, aluminum, brass, titanium, and tungsten. It could also be contemplated that the electrode materials could be conducting carbons, polymers, ceramics, and intermetallics, including composites and coating thereof.

The assembly of the multi-rod electrode system is accomplished using a holding plate, through which half the electrodes are inserted through the top plate and embedded part-way in the bottom plate. This creates the positive electrodes. The other half of the electrodes are inserted through the bottom plate and embedded part-way in the top plate to create the negative electrodes as shown in FIG. 2. The distance between the electrodes (i.e., the micro gap dimension/distance) should be less than 300 µm. In an alternative embodiment, the distance is 100 µm or less.

The overall dimension of the electrode system is from about 10 mm to about 30 mm in diameter, and from about 10 mm to about 50 mm in height, although this is a non-limiting example and other dimensions are contemplated. In more specific embodiments, the electrode system is from about 10 mm to about 15 mm in diameter. In certain embodiments, the electrode system is from about 20 mm to about 40 mm in height.

Example 3

Micro-Engineered Coated-Electrode System
(Design 3, Perpendicular Electric Field)

Figure 3:
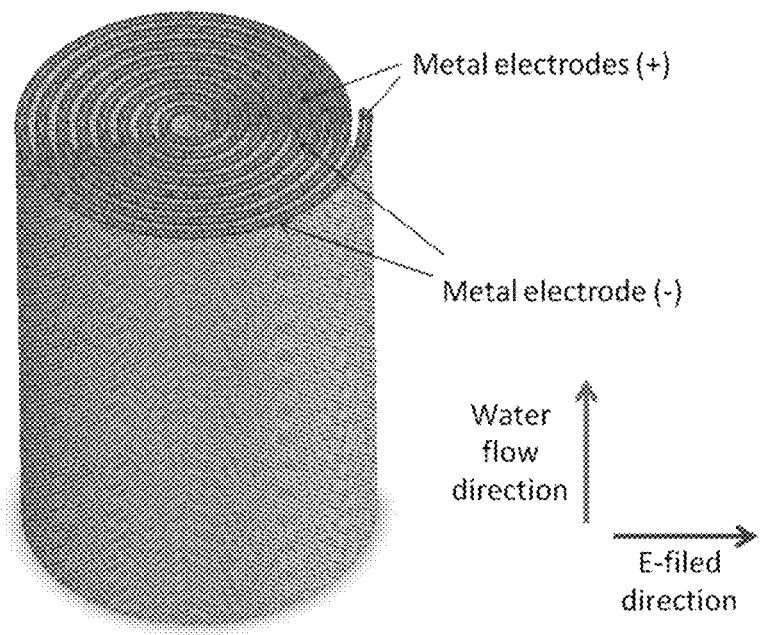
FIG. 3 is a schematic diagram showing a micro-engineered coated-electrode system with the installation showing water flow direction perpendicular to the E-field direction.

FIG. 3 is a non-limiting schematic diagram showing a micro-engineered coated electrode system (Design 3). The system is installed such that the direction of the electric field is perpendicular to the direction of tap water flow. The electrodes in this non-limiting example are in the form of a mesh, but could also be in the form of a screen, perforated plates or foils, porous plates and foils, fabrics, papers, micropatterned foils, or any materials containing through porosity. Mesh sizes ranging from about 20 mesh to about 200 mesh are suitable. In certain embodiments the mesh size is 40 mesh, 50 mesh, or 100 mesh. The electrode materials in this non-limiting example are metals or their alloys, particularly stainless steel, aluminum, brass, titanium, and/or tungsten. It is also contemplated that the electrode materials could be conducting carbons, polymers, ceramics, and intermetallics, including composites and coatings thereof.

A protective coating of less than 100 µm is deposited on the surface of the electrode by electrophoretic deposition (e.g., electropolymerization, anodizing, or E-coating) depending on the electrode material. The two coated electrodes are rolled together to give a spiral-wound electrode configuration shown in FIG. 3. One of the electrodes is the positive electrode and the other one is the negative electrode. The overall dimension of the electrode is 10 mm in diameter and 20 mm in height, although this is a non-limiting example and other dimensions are contemplated.

Example 4

Micro-Engineered Printed Electrode System
(Design 4, Perpendicular Electric Field)

Figure 4:
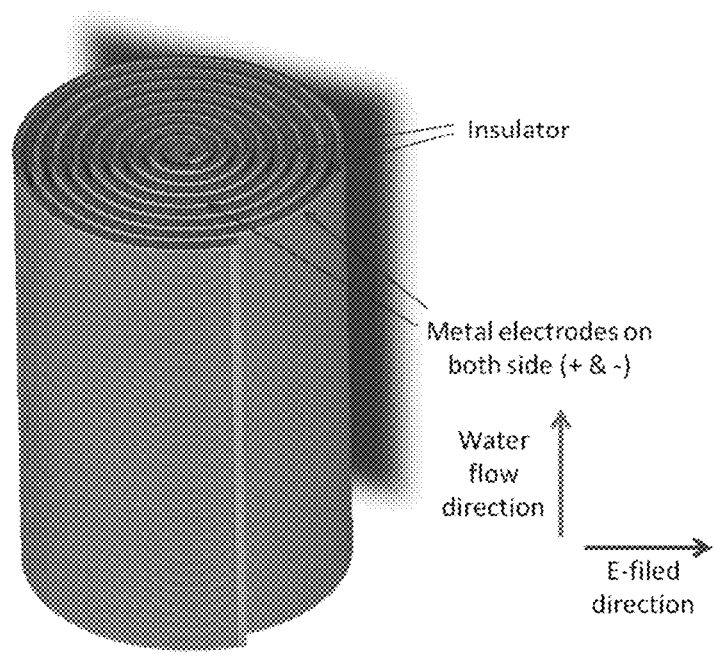
FIG. 4 is a schematic diagram showing a micro-engineered printed electrode system with the installation showing the water flow direction perpendicular to the E-field direction.

FIG. 4 is a non-limiting schematic diagram showing a micro-engineered printed electrode system (Design 4). The system is installed such that the direction of the electric field generated is perpendicular to the direction of tap water flow. The electrodes (FIG. 5) are printed on a flexible substrate. Materials useful as the flexible substrate include, without limitation, plastics, fabrics, and/or insulated metal foils. The printed electrodes have a size of 50 µm and a micro-gap distance of 50 µm. For the electrode pattern A in FIG. 5, the electrodes are printed on both sides of the substrate so that the positive electrodes are on one side and the negative electrodes are on the other side. For the electrode patterns B and C, parallel positive and negative electrode patterns are printed on both surfaces of the substrate. The electrode materials in this non-limiting example are metals or their alloys, particularly stainless steel, aluminum, brass, titanium, and/or tungsten. It is also contemplated that the electrode materials be conducting carbons, polymers, ceramics, and intermetallics, including composites and coatings thereof.

A porous barrier made of insulating material with a maximum thickness of 100 µm is used to create a micro-gap between the electrodes, as shown in FIG. 4. In an alternative embodiment, a non-electrical conducting protective layer of less than 100 µm could be deposited on the electrode surface by an E-coating process, so that the porous barrier could be omitted. The printed electrode substrate with or without the porous barrier are rolled together to give a spiral-wound electrode configuration shown in FIG. 4. The overall dimension of the electrode is 10 mm in diameter and 10 mm in height, although this is a non-limiting example and other dimensions are contemplated.

Example 5

Micro-Engineered Porous Electrode System
(Design 1, Parallel Electric Field)

Figure 6:
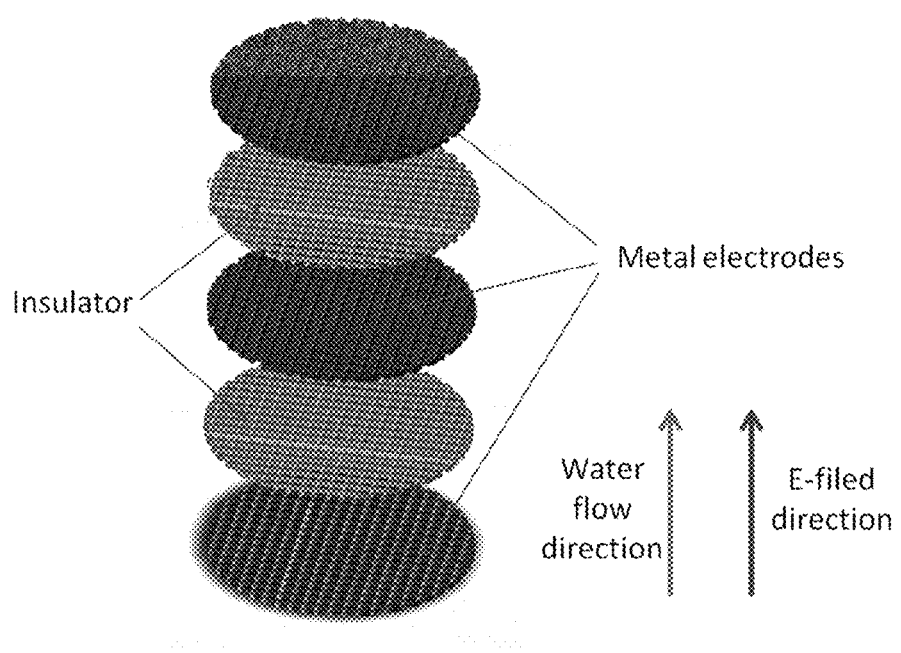
FIG. 6 is a schematic diagram showing a micro-engineered porous electrode system with the installation showing water flow direction parallel to the E-field direction.

FIG. 6 shows a non-limiting schematic diagram of a micro-engineered porous electrode system (Design 1). The system is installed such that the direction of the electric field is parallel to the direction of tap water flow. The electrodes in this non-limiting example are in the form of a mesh, but could also be in the form of a screen, perforated plates or foils, porous plates and foils, fabrics, papers, micropatterned foils, or any materials containing through porosity. Mesh size of 40 mesh, 50 mesh, and 100 mesh is suitable. The electrode materials in this non-limiting example are metals or their alloys particularly stainless steel, aluminum, brass, titanium, and/or tungsten. It is also contemplated that the electrode material could be conducting carbons, polymers, ceramics, and intermetallics, including composites and coatings thereof.

A porous barrier made of insulating material with a maximum thickness of 100 µm is used to create a micro-gap between the electrodes as shown in FIG. 6. In the alternative, the barrier could be a non-electrical conducting protective layer of less than 100 µm deposited on the electrodes surface by an electrophoretic deposition process (e.g., electropolymerization, anodization, or E-coating) depending on the electrode material, so that the physical barrier could be omitted. The micro-engineered electrodes can have a minimum of two electrodes with a separator, but more electrode-separator pairs are contemplated. The number of electrode-separator pairs is constrained mainly by the optimal overall thickness of 10 mm and water pressure drop of not more than 10%. An example of micro-engineered electrodes comprises up to 20 electrode-separator layers with a diameter of 10 mm and a thickness of 10 mm.

Example 6

Micro-Engineered Multi-Rod Electrode System
(Design 2, Parallel Electric Field)

Figure 7:
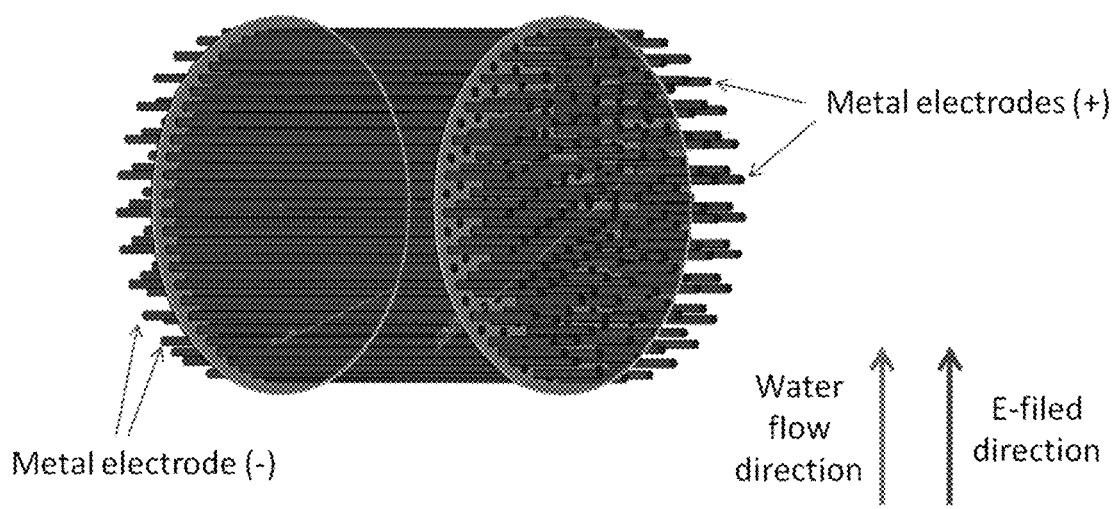
FIG. 7 is a schematic diagram showing a micro-engineered multi-rod electrode system with the installation showing water flow direction parallel to the E-field direction.

FIG. 7 is a non-limiting schematic diagram showing a micro-engineered multi-rod electrode system (Design 2). The system is installed such that the direction of the electric field is parallel to the direction of tap water flow. The electrodes are in the shape of rods with a diameter of 300 µm, but could also be thinner or thicker depending on the mechanical properties of the materials. The electrodes could also be in the form of twisted wires, hollow rods, flat plates, and rods of different cross-sectional materials including, but not limited to, angular shapes with the purpose of creating intense electrical fields. The electrode materials in this non-limiting example are metals or their alloys, particularly stainless steel, aluminum, brass, titanium, and/or tungsten. It is also contemplated that the electrode materials could be conducting carbons, polymers, ceramics, and intermetallics, including composites and coatings thereof.

The assembly of the multi-rod electrode system is accomplished using a holding plate, through which half the electrodes are inserted through the top plate and embedded part-way in the bottom plate. This creates the positive electrodes. The other half of the electrodes are inserted through the bottom plate and embedded part-way in the top plate to create the negative electrodes as shown in FIG. 7. The distance between the electrodes should be less than 300 µm. In an alternative embodiment, the distance is 100 µm or less. The overall dimension of the electrode system is 10 mm in diameter and 10 mm in height, although this is a non-limiting example and other dimensions are contemplated.

Example 7

Micro-Engineered Coated-Electrode System
(Design 3, Parallel Electric Field)

Figure 8:
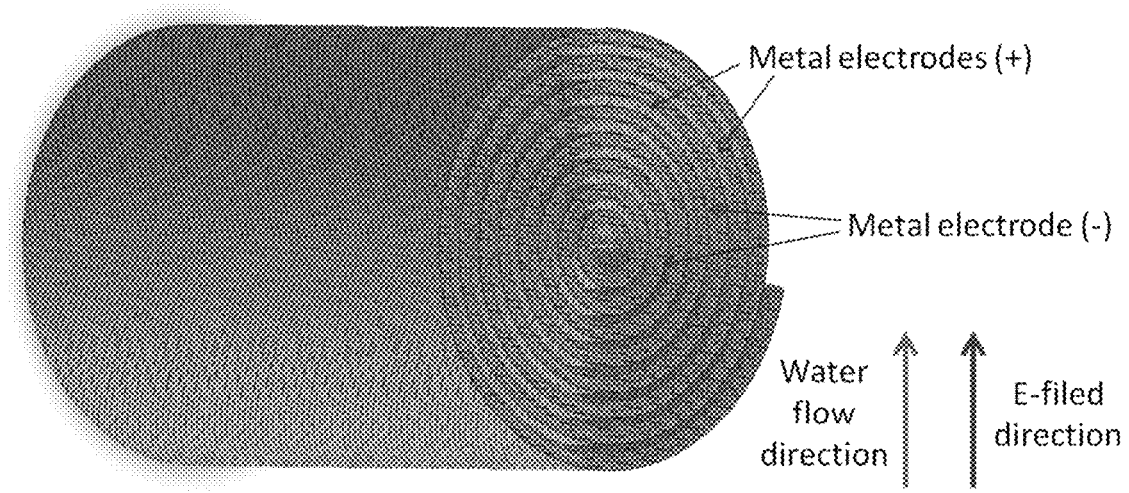
FIG. 8 is a schematic diagram showing a micro-engineered coated-electrode system with the installation showing water flow direction parallel to the E-field direction.

FIG. 8 is a non-limiting schematic diagram showing a micro-engineered coated-electrode system (Design 3). The system is installed such that the direction of the electric field is parallel to the direction of tap water flow. The electrodes in this non-limiting example are in the form of a mesh, but could also be in the form of a screen, perforated plates or foils, porous plates and foils, fabrics, papers, micropatterned foils, or any materials containing through porosity. Mesh size of 40 mesh, 50 mesh, and 100 mesh is suitable. The electrode materials in this non-limiting example are metals or their alloys, particularly stainless steel, aluminum, brass, titanium, and/or tungsten. It is also contemplated that the electrode material could be conducting carbons, polymers, ceramics, and intermetallics, including composites and coatings thereof.

A protective coating of less than 100 µm is deposited on the surface of the electrode by an electrophoretic deposition process (e.g., electropolymerization, anodizing, or E-coating) depending on the electrode material. The two coated electrodes are rolled together to give a spiral-wound electrode configuration shown in FIG. 8. One of the electrodes is the positive electrode and the other one is the negative electrode. The overall dimension of the electrode is 10 mm in diameter and 20 mm in height, although this is a non-limiting example and other dimensions are contemplated.

Example 8

Micro-Engineered Printed Electrode System
(Design 4, Parallel Electric Field)

Figure 9:
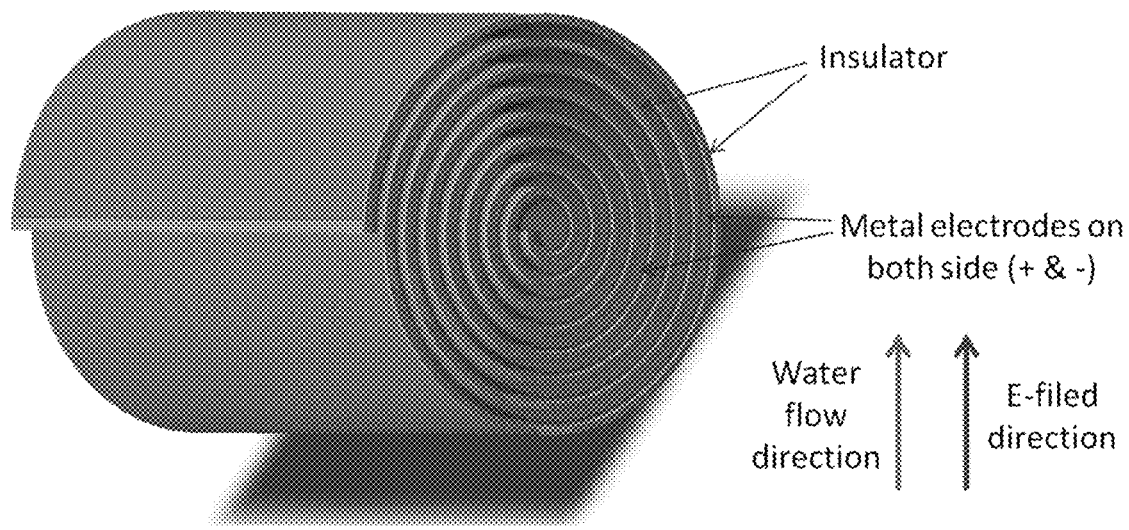
FIG. 9 is a schematic diagram showing a micro-engineered printed electrode system with the installation showing water flow direction parallel to the E-field direction.

FIG. 9 is a schematic diagram showing a micro-engineered printed electrode system (Design 4). The system is installed such that the direction of the electric field generated is perpendicular to the direction of tap water flow. The electrodes (FIG. 5) are printed on a flexible substrate. Materials useful as the flexible substrate include, without limitation, plastics, fabrics, and/or insulated metal foils. The printed electrodes have a size of 50 µm and a micro-gap distance of 50 µm.

Figure 5:
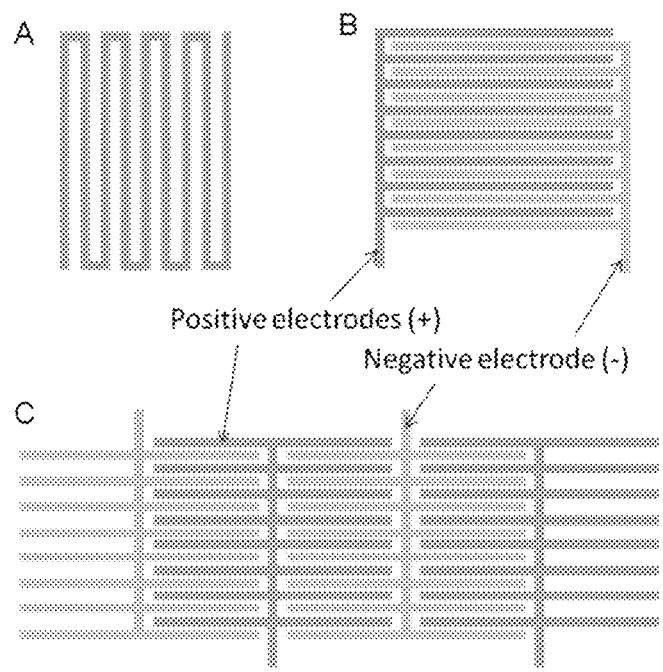
FIG. 5 is a schematic diagram showing printed electrodes on the substrate for micro-engineered printed electrode system.

The electrodes in pattern A shown in FIG. 5 are printed on both sides of the substrate such that the positive electrodes are on one side and the negative electrodes are on the other side. For the electrodes in patterns B and C, parallel positive and negative electrodes patterns are printed on both sides (surfaces) of the substrate. The electrode materials in this non-limiting example are metals or their alloys, particularly stainless steel, aluminum, brass, titanium, and/or tungsten. It is also contemplated that the electrode materials could be conducting carbons, polymers, ceramics, and intermetallics, including composites and coatings thereof.

A porous barrier made of an insulating material with a maximum thickness of 100 μm is used to create a micro-gap between the electrodes as shown in FIG. 9. In an alternative embodiment, a non-electrical conducting protective layer of less than 100 μm could be deposited on the electrode surface by an E-coating process, so that the porous barrier could be omitted. The printed electrode substrate with or without the porous barrier is/are rolled together to give a spiral-wound electrode configuration shown in FIG. 9. The overall dimension of the electrode is 10 mm in diameter and 10 mm in height, although this is a non-limiting example and other dimensions are contemplated.

Example 9

Low-Voltage Pulsed Electric Field Circuit (Design 1)

Figure 10:
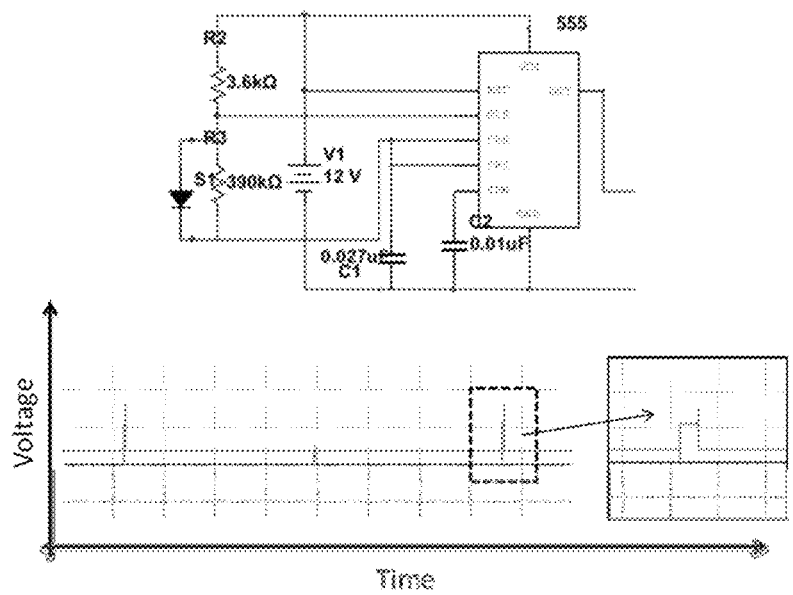
FIG. 10 is a schematic diagram showing a miniature pulsed electric field generator with its pulsed form generated by computer simulation.

FIG. 10 is a schematic diagram showing a low-voltage pulsed electric field circuit (Design 1). This design is using Timer IC 555 to generate a square wave pulse. Timer IC 555 consists of logic gates, flip flop amplifiers, and transistors. When an input power is supplied, the amplifier acts as a comparator to determine the on/off of the circuit. Flip flop then regulates the input signal with the help of the transistor and gives this IC a constant pulse output. Capacitors in the circuit are present to stabilize the circuit as well as to control the charging and discharging time of the pulse given by Timer IC. Thus, pulse width and frequency of the output can be controlled.

Use of the Timer IC 555 provides a short-cut for a low voltage pulse generator. It can be appreciated by a skilled artisan that without the Timer IC 555, a few more complex circuits (e.g., logic gates, flip flop, and amplifier) would be required in order to replace the built-in design of the Timer IC 555. However, these additional circuits would make the whole circuit large and bulky in size, and therefore challenging or even impossible to achieve a miniature and portable finished device.

Pulse width is a critical parameter determining the disinfection performance. Pulse frequency and pulse width are interrelated, and a mixture of different pulse widths gives a better disinfection performance. The pulse width and pulse frequency can be adjusted by changing the values of resistors and capacitors in the circuit. Different frequencies and pulse widths are required for different disinfection environments.

In this design, typically, a pulse frequency of 75 Hz and a pulse width of 85 microseconds (μs) are generated. For each of the low-voltage generator circuits disclosed herein, the pulse frequency is set in the range of from about 1 Hz to about 100 kHz, and the pulse width ranges from about 20 nanoseconds (ns) to about 100 milliseconds (ms) for achieving effective disinfection. In certain embodiments, the pulse frequency is from about 80 Hz to about 100 Hz, and the pulse width is from about 50 (μs) to 1 ms.

Example 10

Low-Voltage Pulsed Electric Field Circuit (Design 2)

Figure 11:
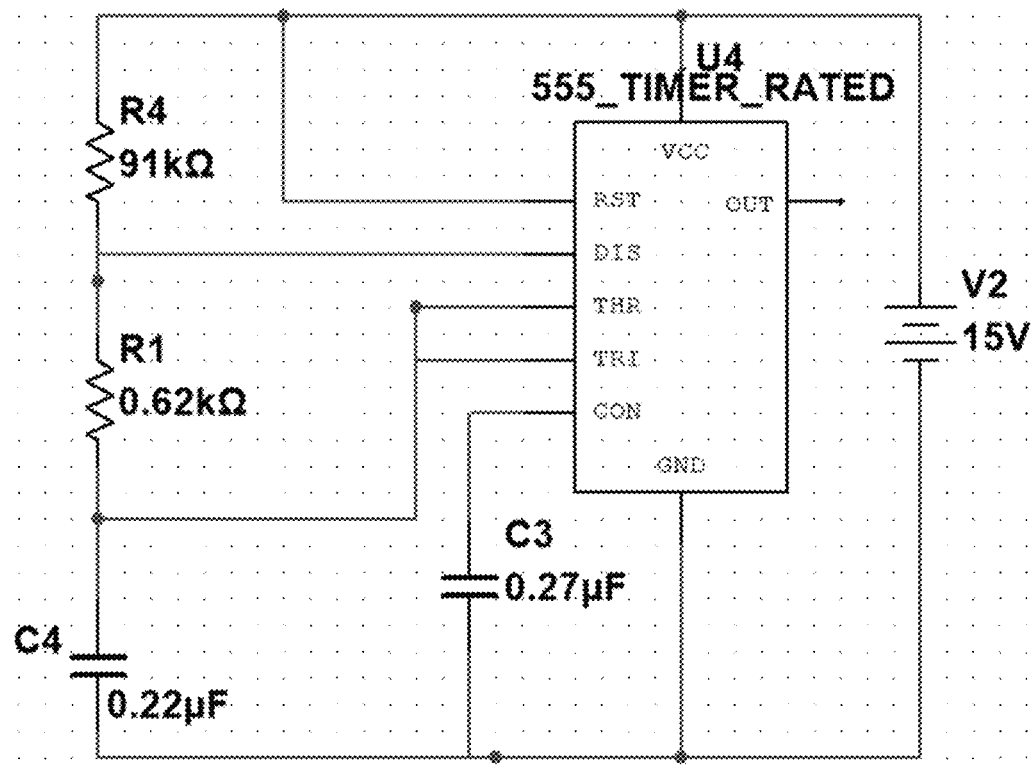
FIG. 11 is a schematic diagram showing a circuit design of miniature pulsed electric field generator with its pulsed form generated by computer simulation.
Figure 11:
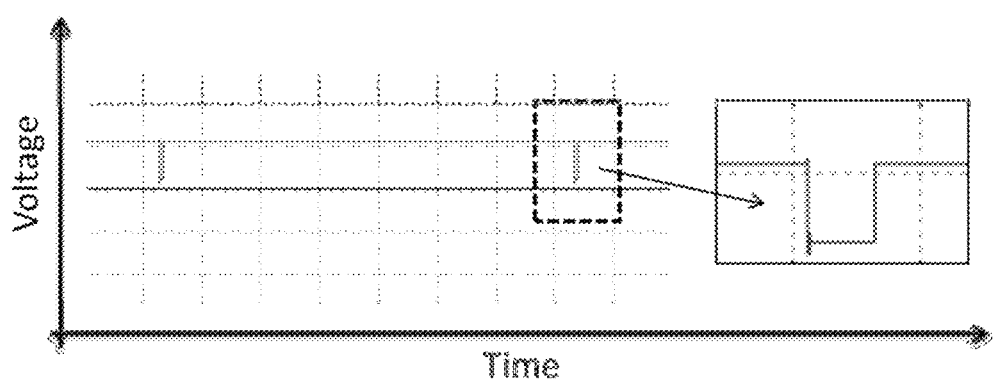

FIG. 11 is a schematic diagram showing a low-voltage pulsed electric field circuit (Design 2). This design is using Timer IC 555 to generate a square wave pulse. Timer IC 555 consists of logic gates, flip flop amplifiers, and transistors. When input power is supplied, the amplifier acts as a comparator to determine the on/off of the circuit. The flip flop then regulates the input signal with the help of the transistor and gives this IC a constant pulse output. Capacitors in the circuit stabilize the circuit as well as control the charging and discharging time of the pulse given by Timer IC. Thus, pulse width and frequency of the output can be controlled. This is the short-cut for a low voltage pulse generator. The pulse width and wave frequency are adjustable by changing the values of resistors and capacitors in the circuit. In certain embodiments, the circuit can generate a high voltage negative pulse with a duration less than 100 μs if suitable capacitors and resistors are used. In this design, typically, a negative pulse with a frequency of 70 Hz and a pulse width of 104 μs is generated.

Example 11

Low-Voltage Pulsed Electric Field Circuit (Design 3)

Figure 12:
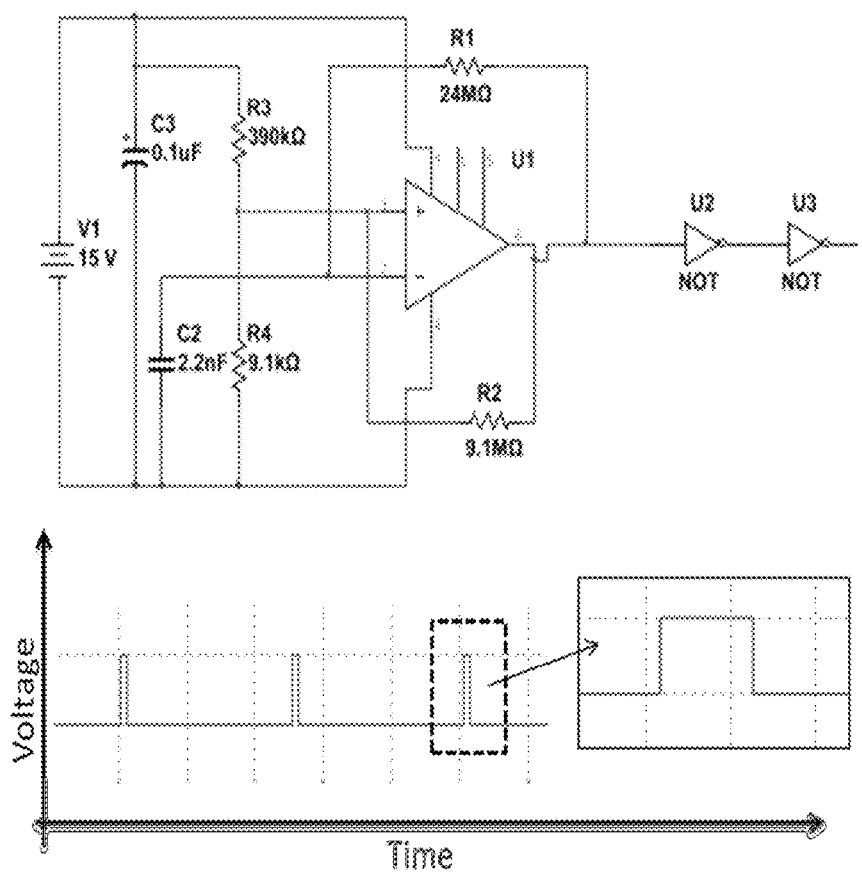
FIG. 12 is a schematic diagram showing a circuit design of miniature pulsed electric field generator with its pulsed form generated by computer simulation.

FIG. 12 is a schematic diagram showing a low-voltage pulsed electric field circuit (Design 3). This circuit uses an operational amplifier to generate a square wave pulse. $R_1$, $R_2$, $R_3$, and $R_4$ all are involved in controlling the frequency and pulse width. $R_1$ and $R_2$ are in the feedback design, which helps stabilize and control the output range so that the circuit can be stable. $C_2$ is the key component determining the frequency. The larger the value $C_2$ has, the longer the discharging time of $C_2$ will be, so the frequency will be shorter. By adding appropriate capacitors and resistors, the circuit generates an almost perfect square pulse with short duration. To generate a perfect square waveform pulse when few hundred microseconds of pulse width is desired, logic gates are added to reshape the pulse generate. In this design, typically, a pulse with a frequency of 80 Hz and a pulse width of 200 μs is generated.

Example 12

Using a Micro-Engineered Porous Electrode System with Initial *E. coli* Concentration of $10^4$ CFU/ml, Pulse Width of 100 μs, Pulse Frequency of 100 Hz, and Input Voltage of 5 V A micro-engineered porous electrode system is used for the disinfection of tap water containing $10^4$ CFU/ml of *E. coli*. Voltage input of 5 V to low-voltage pulsed electric field circuit generates a pulse with a frequency of 100 Hz and a pulse width of 100 μs. The pulsed electric field intensity is therefore 0.5 kV/cm. In an embodiment, reduction of 90% of *E. coli* in the tap water is achieved.

Example 13

Using a Micro-Engineered Porous Electrode System with Initial *E. coli* Concentration of $10^4$ CFU/ml, Pulse Width of 100 μs, Pulse Frequency of 100 Hz, and Input Voltage of 10 V A micro-engineered porous electrode system is used for the disinfection of tap water containing $10^4$ CFU/ml of *E. coli*. Voltage input of 10 V to low-voltage pulsed electric field circuit generates a pulse with a frequency of 100 Hz and a pulse width of 100 μs. The pulsed electric field intensity is therefore 1 kV/cm. In an embodiment, reduction of 90% of E.coli in the tap water is achieved.

Example 14

A Micro-Engineered Porous Electrode System According to FIG. 6

Figure 15:
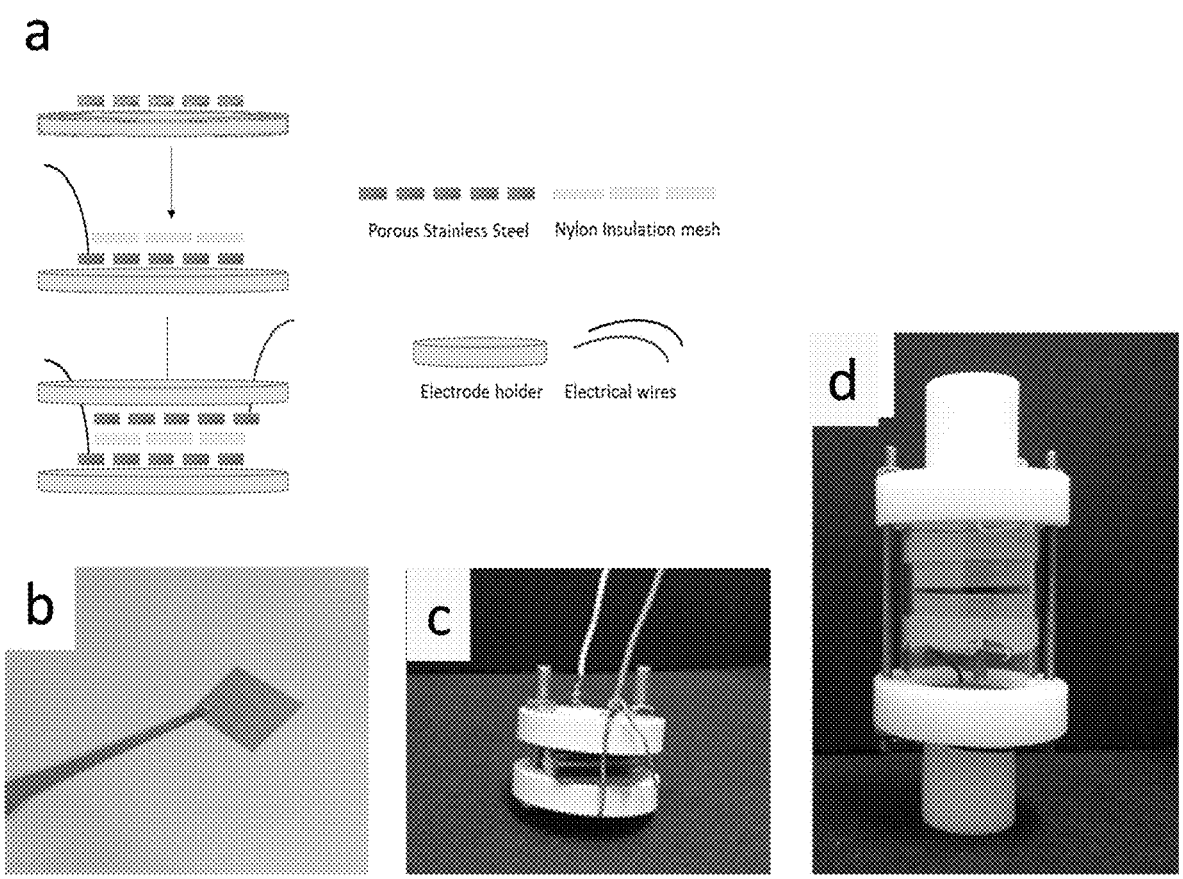
FIG. 15 (a) is a schematic diagram showing a method for assembly of a PEF device consisting of a porous electrodes with the micro-gap maintained by a thin insulating mesh. Pictures of (b) the porous electrode, (c) assembled electrode, and (d) housed PEF for laboratory testing.

The micro-engineered porous electrode system shown in FIG. 15 is made of porous stainless steel of 70 µm thickness (Type 304) with the nylon spacer (Dow, USA) used for separating the positive and negative electrodes. Each electrode has an area of 1.2×1.2 cm$^2$ with a micro-gap distance of 240 µm. A single pair of electrodes can attain a 98.5% reduction in E. coli.

Example 15

Figure 16:
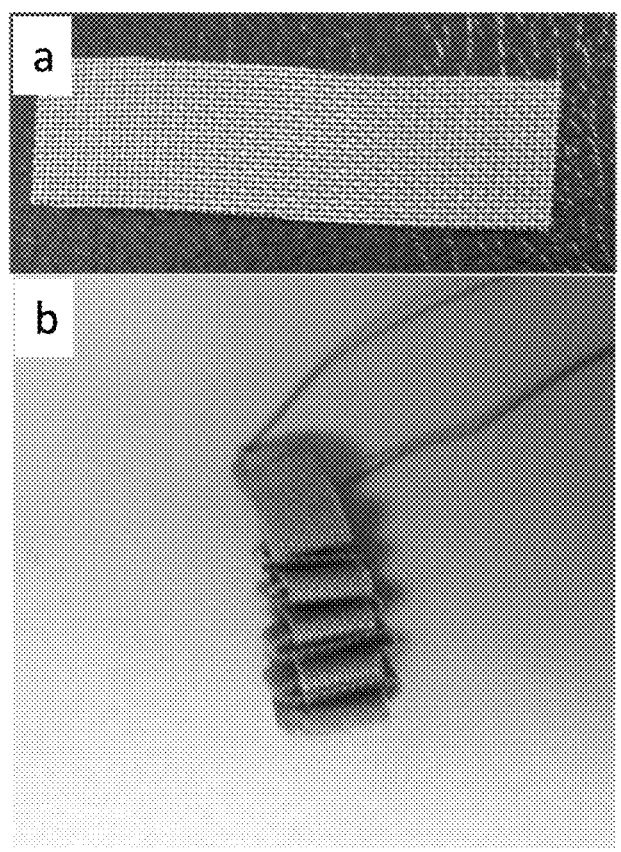
FIG. 16 shows pictures of (a) a porous mesh electrode and (b) its assembly by an "origami" method into a compact PEF electrode.

A Micro-Engineered Porous Electrode System According to FIG. 6 Prepared from Two Large Electrodes by an "Origami" Method The micro-engineered porous electrode system shown in FIG. 16 is made of porous stainless steel of 70 µm thickness (Type 304) with the nylon spacer (Dow, USA) used for separating the positive and negative electrodes. A pair of electrodes, each with a size of 10×1.2 cm$^2$ and a nylon spacer measuring 11×1.2 cm$^2$ was folded together in an "origami" fashion to create a compact electrode assembly that occupies less space and volume.

Example 16

A Micro-Engineered Porous Electrode System According to FIG. 8

Figure 17:
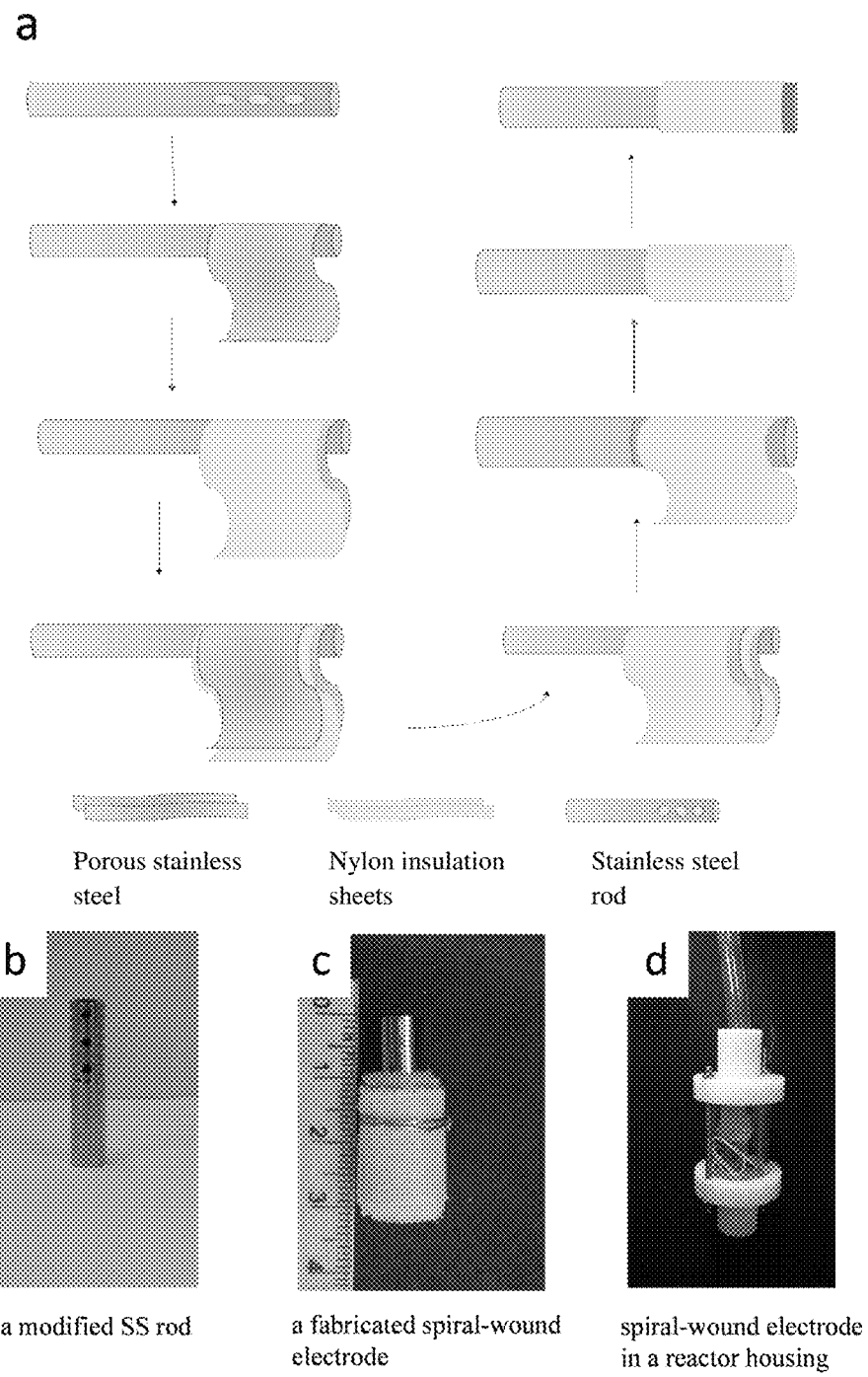
FIG. 17 is (a) a schematic diagram showing a typical assembly of a spiral-wound PEF electrode and pictures of (b) a central conducting rod with water distribution channel, (c) an assembled electrode, and (d) a housed PEF for laboratory testing.

The micro-engineered porous electrode system shown in FIG. 17 is made of porous stainless steel of 70 µm thickness (Type 304) and nylon spacers (Dow, USA) are used for separating the positive and negative electrodes. Each electrode measured 1.2×1.2 cm$^2$ in area with a micro-gap distance of 200 µm. A single pair of electrodes can attain a 99.9% reduction in E. coli.
Silicalite-1 Zeolite Coated Electrode (Direct Synthesis Method)

Example 17

Silicalite-1 zeolite coated electrode (Direct synthesis method)

Figure 18:
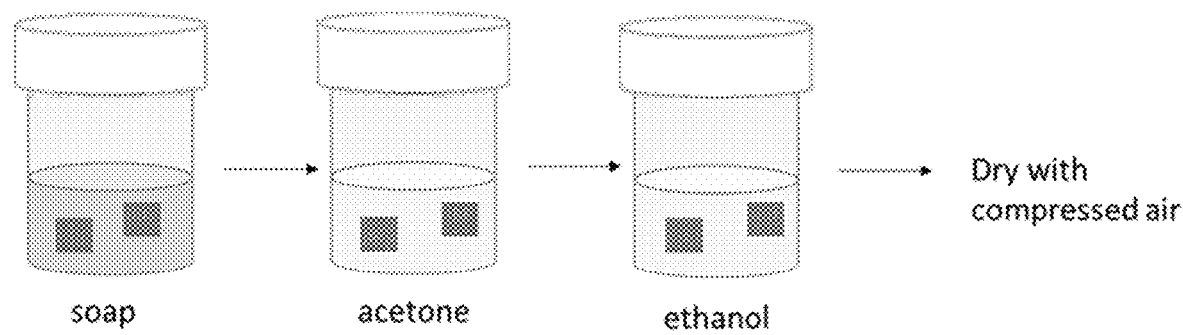
FIG. 18 is a schematic diagram showing the cleaning of the electrode prior to coating with a layer of zeolites or zeotype materials.
Figure 19:
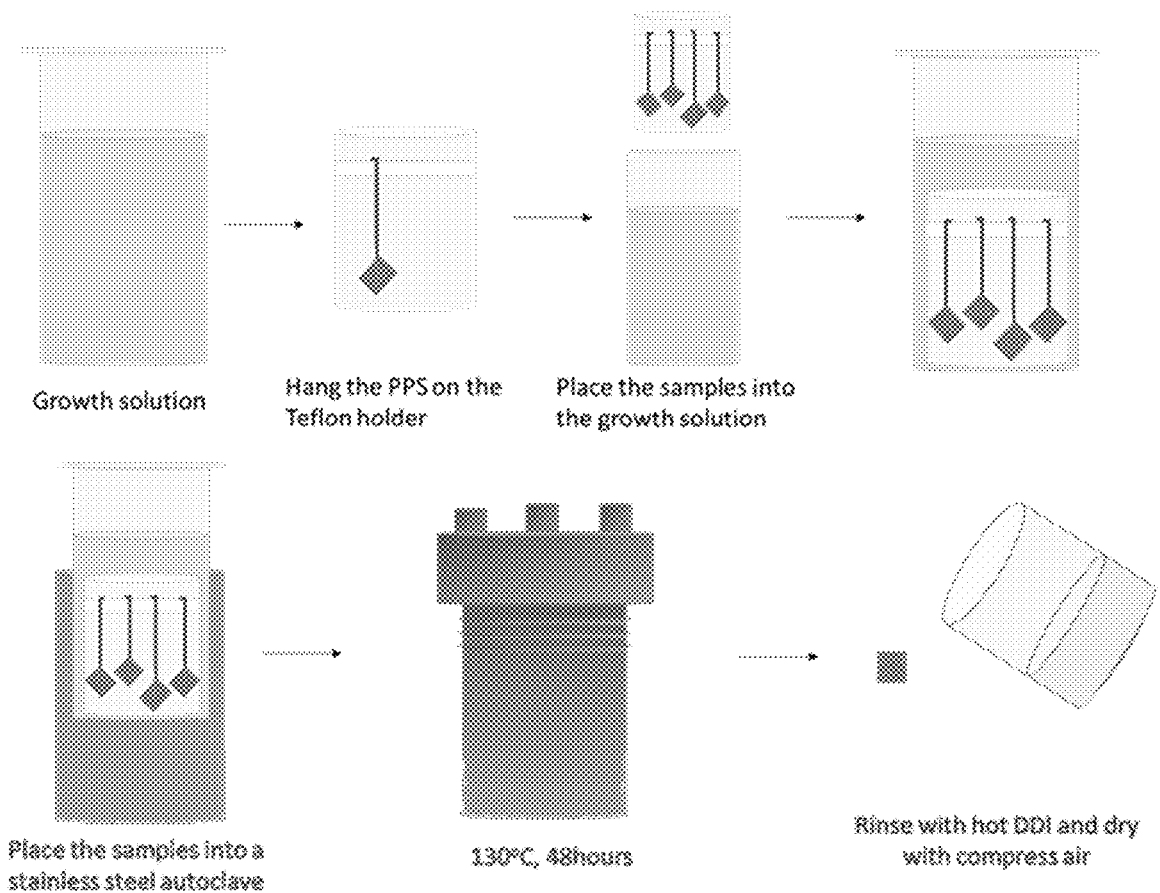
FIG. 19 is a schematic diagram showing a typical method of zeolite growth on the electrode by a direct synthesis approach.

An electrode with a size of 2.5 cm×2.5 cm is cleaned as shown in FIG. 18 in a series of washing steps designed to remove dirt, grease and oil, solvent, and oxides by using detergent water, acetone, alcohol, and mineral acid (HCl) respectively, before rinsing with water and drying. The Silicalite-1 synthesis solution is prepared from a silica precursor and a structure directing agent (SDA) dissolved in water. A typical synthesis mixture has molar ratio of 1 SiO$_2$: 0.1-5 SDA: 500-40,000 H$_2$O. The clean electrode is immersed in the synthesis solution and aged overnight before placing in an autoclave vessel (FIG. 19). The synthesis is carried out at 100-200° C. for 12-100 hours. A Silicalite-1 zeolite coated electrode is obtained after hot DDI water rinsing.

Example 18

MFI Zeolite Coated Electrode (Direct Synthesis Method)

An electrode with a size of 2.5 cm×2.5 cm is cleaned in a series of washing steps designed to remove dirt, grease and oil, solvent, and oxides by using detergent water, acetone, alcohol, and mineral acid (HCl) respectively, before rinsing with water and drying. The MFI synthesis solution is prepared from a silica precursor and a SDA dissolved in water. ZSM-5, TS-1 and VS-1 are prepared with the addition of aluminum, titanium, and vanadium precursor, respectively. A typical synthesis mixture has molar ratio of 1 SiO$_2$: y MO$_x$: 0.01-0.5 SDA: 20-2,000 H$_2$O. The electrode substrate is immersed in the synthesis solution and aged overnight before placing in an autoclave vessel. The synthesis is carried out at 100-200° C. for 12-100 hours. A 10 µm thick ZSM-5 coated electrode is prepared from 1 SiO$_2$: 0.01 Al$_2$O$_3$: 0.06 TPA$_2$O: 40 H$_2$O at 175° C. for 24 hours. A 10 µm thick TS-1 coated electrode is prepared from 1 SiO$_2$: 0.01 TEOT: 0.06 TPA$_2$O: 40 H$_2$O at 175° C. for 24 hours. A 10 µm thick VS-1 coated electrode is prepared from 1 SiO$_2$: 0.01 VOSO$_4$: 0.06 TPA$_2$O: 40 H$_2$O at 175° C. for 24 hours. A MFI zeolite coated electrode is obtained after hot DDI water rinsing.

Example 19

Silicalite-1 Zeolite Coated Electrode (Seeding and Regrowth Method)

Figure 20:
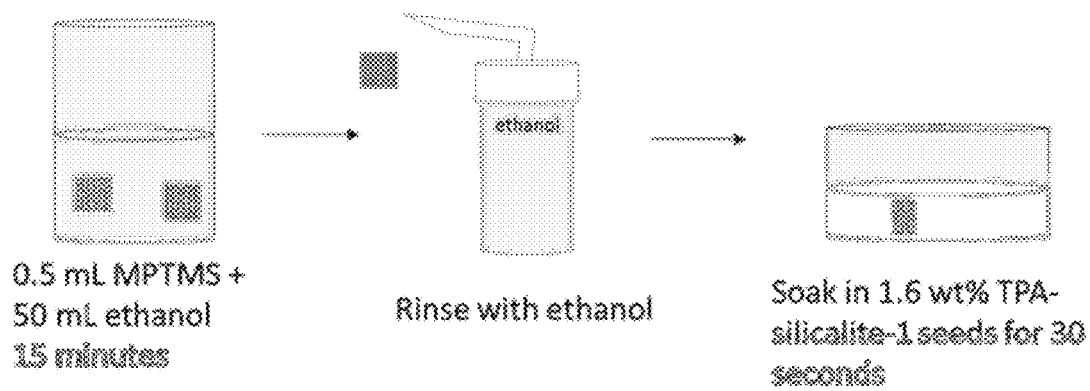
FIG. 20 is a schematic diagram showing a typical way of seeding the surface of the electrodes with zeolites prior to growth of the zeolite film.
Figure 21:
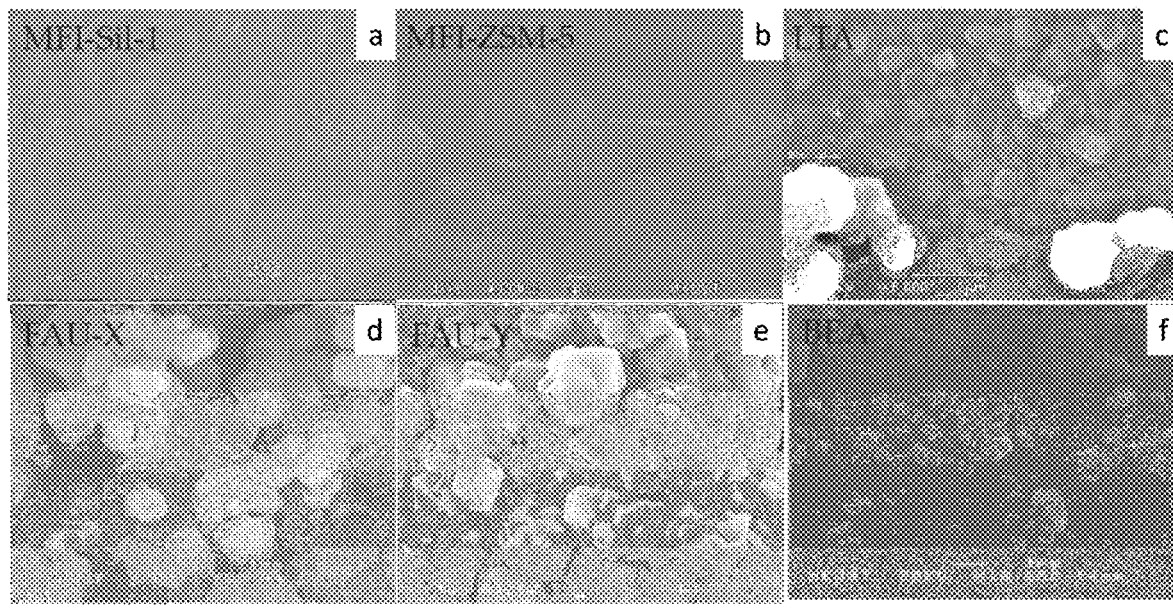
FIG. 21 displays the pictures of the electrode coated by a thin and continuous layer of (a) Sil-1 zeolite, (b) ZSM-5 zeolite, (c) LTA zeolite, (d) faujasite X zeolite, (e) faujasite Y zeolite, and (f) BEA, H-beta zeolite.

An electrode with a size of 2.5 cm×2.5 cm is cleaned as shown in FIG. 18 in a series of washing steps designed to remove dirt, grease and oil, solvent, and oxides by using detergent water, acetone, alcohol, and mineral acid (HCl) respectively, before rinsing with water and drying. The clean electrode is sequentially dipped in 1 vol % 3-mercaptopropyl trimethoxysilane solution in ethanol for 15 minutes and 1.6 wt % TPA-silicalite-1 seeds in DDI water for 30 seconds, followed by drying at 100° C. for 15 minutes (FIG. 20). The process is repeated at least twice. Silicalite-1 zeolite is grown on the seeded electrode from a synthesis solution with a molar ratio of 1 SiO$_2$: 0.1-5 SDA: 200-20,000 H$_2$O.
A typical synthesis solution is prepared by adding drop by drop 3.4 ml of tetraethyl orthosilicate (TEOS) into the mixture of 1.9 ml of 1 M tetrapropylammonium hydroxide (TPAOH) aqueous solution and 68.5 ml of DDI water, followed by stirring at room temperature for 24 hours. Seeded electrode is positioned vertically in a Teflon holder. Silicalite-1 synthesis solution and the holder with seeded electrode are transferred into Teflon-lined stainless-steel autoclave and hydrothermal-treated at 130° C. for 48 hours to grow Silicalite-1 zeolite on an electrode. A Silicalite-1 zeolite coated electrode is obtained after hot DDI water rinsing as shown in FIG. 21a.

Example 20

ZSM-5 Zeolite Coated Electrode (Seeding and Regrowth Method)

An electrode with a size of 2.5 cm×2.5 cm is cleaned in a series of washing steps designed to remove dirt, grease and oil, solvent, and oxides by using detergent water, acetone, alcohol, and mineral acid (HCl) respectively, before rinsing with water and drying. The clean electrode is sequentially dipped in 1 vol % 3-mercaptopropyl trimethoxysilane solution in ethanol for 15 minutes and 1.6 wt % TPA-silicalite-1 seeds in DDI water for 30 seconds, followed by drying at 100° C. for 15 minutes. The process is repeated at least twice. ZSM-5 zeolite is grown on the seeded electrode from a synthesis solution with a molar ratio of 1 $SiO_2$: y $Al_2O_3$: 0.01-0.5 SDA: 500-40,000 $H_2O$.

A typical synthesis solution is prepared by dissolving 0.16 ml 1 M TPAOH and 0.066 g of NaOH in 60 ml of DDI water. Then aluminum hydroxide is prepared via the reaction of $Al_2(SO_4)_3 \cdot 18H_2O$ (0.22 g) and excessive ammonia is added little by little into the solution, followed by the slow addition of 1.48 ml of TEOS. The resulting solution is stirred at room temperature for 24 hours to produce a clear and homogeneous synthesis solution with the molar ratio of 1 $SiO_2$: 0.05 $Al_2O_3$: 0.0125 $TPA_2O$: 0.125 $Na_2O$: 500 $H_2O$. The seeded electrode is positioned vertically in a Teflon holder. The ZSM-5 synthesis solution and the holder with seeded electrode are transferred into Teflon-lined stainless-steel autoclave and hydrothermal-treated at 150° C. for 48 hours to grow ZSM-5 zeolite on the electrode. The ZSM-5 zeolite coated electrode is obtained after hot DDI water rinsing as shown in FIG. 21b.

Example 21

MFI Zeolite Coated Electrode (Seeding and Regrowth Method)

An electrode with a size of 2.5 cm×2.5 cm is cleaned in a series of washing steps designed to remove dirt, grease and oil, solvent, and oxides by using detergent water, acetone, alcohol, and mineral acid (HCl) respectively, before rinsing with water and drying. The clean electrode is sequentially dipped in 1 vol % 3-mercaptopropyl trimethoxysilane solution in ethanol for 15 minutes and 1.6 wt % TPA-silicalite-1 seeds in DDI water for 30 seconds, followed by drying at 100° C. for 15 minutes. The process is repeated at least twice. MFI is prepared from synthesis mixtures with a molar ratio of 1 SiO2: $yMO_x$: 0.01-0.5 SDA: 500-40,000 $H_2O$. The seeded electrode is positioned vertically in Teflon holder. The TS-1 coated electrode is prepared from 1 $SiO_2$: 0.01 TEOT: 0.0125 $TPA_2O$: 500 $H_2O$ at 175° C. for 24 hours, and the VS-1 coated electrode is prepared from 1 $SiO_2$: 0.01 $VOSO_4$: 0.0125 $TPA_2O$: 500 $H_2O$ at 175° C. for 24 hours. A MFI zeolite coated electrode is obtained after hot DDI water rinsing.

Example 22

LTA Zeolite Coated Electrode (Seeding and Regrowth Method)

An electrode with a size of 2.5 cm×2.5 cm is cleaned in a series of washing steps designed to remove dirt, grease and oil, solvent, and oxides by using detergent water, acetone, alcohol, and mineral acid (HCl) respectively, before rinsing with water and drying. The clean electrode is sequentially dipped in 1 vol % 3-mercaptopropyl trimethoxysilane solution in ethanol for 15 minutes and 1.6 wt % NaA seeds in DDI water for 30 seconds, followed by drying at 100° C. for 15 minutes. The process is repeated at least twice. LTA is prepared from synthesis mixtures with molar ratio of 1 $SiO_2$: 0.5 $Al_2O_3$: 0.5-2 $Na_2O$: 40-300 $H_2O$. The seeded electrode is positioned vertically in Teflon holder. The synthesis is carried out at 80-100° C. for 1-12 hours. The NaA coated electrode is prepared from 1 $SiO_2$: 0.5 $Al_2O_3$: 1 $Na_2O$: 60 $H_2O$ at 100° C. for 6 hours. A LTA zeolite coated electrode is obtained after hot DDI water rinsing as shown in FIG. 21c.

Example 23

Faujasite Zeolite Coated Electrode (Seeding and Regrowth Method)

An electrode with a size of 2.5 cm×2.5 cm is cleaned in a series of washing steps designed to remove dirt, grease and oil, solvent, and oxides by using detergent water, acetone, alcohol, and mineral acid (HCl) respectively, before rinsing with water and drying. The clean electrode is sequentially dipped in 1 vol % 3-mercaptopropyl trimethoxysilane solution in ethanol for 15 minutes and 1.6 wt % FAU (NaY or NaX) seeds in DDI water for 30 seconds, followed by drying at 100° C. for 15 minutes. The process is repeated at least twice. NaY is prepared from synthesis mixtures with a molar ratio of 1 $SiO_2$: 0.04 $Al_2O_3$: 0.88 $Na_2O$: 25-50 $H_2O$, and NaX is prepared from synthesis mixture with molar ratio of 1 $SiO_2$: 0.15-0.3 $Al_2O_3$: 1.0-1.5 $Na_2O$: 35-70 $H_2O$. The seeded electrode is positioned vertically in Teflon holder. The synthesis is carried out at 90-110° C. for 1-24 hours. The NaY coated electrode and NaX coated electrode are prepared from 1 $SiO_2$: 0.04 $Al_2O_3$: 0.88 $Na_2O$: 40 $H_2O$ at 100° C. for 5 hours and 1 $SiO_2$: 0.28 $Al_2O_3$: 1.4 $Na_2O$: 60 $H_2O$ at 95° C. for 24 hours, respectively. A Faujasite zeolite coated electrode is obtained after hot DDI water rinsing as shown in FIGS. 21d and 21e. A similar approach can also be used to prepare other zeolites including H-beta (BEA) as shown in FIG. 21f.

Example 24

AlPO Coated and SAPO Coated Electrode (Direct Synthesis Method)

An electrode with a size of 2.5 cm×2.5 cm is cleaned in a series of washing steps designed to remove dirt, grease and oil, solvent, and oxides by using detergent water, acetone, alcohol, and mineral acid (HCl) respectively, before rinsing with water and drying. $AlPO_4$-5 is prepared from a synthesis mixture with a molar ratio of 1 $Al_2O_3$: 1.32 $P_2O_5$: 0.5-2 SDA: 50-300 $H_2O$, while SAPO-34 is prepared from a synthesis mixture with a molar ratio of 1 $SiO_2$: 1-5 $Al_2O_3$: 1-5 $P_2O_5$: 0.5-3 SDA: 50-300 $H_2O$. The clean electrode is immersed in the synthesis solution and aged overnight before placing in an autoclave vessel. The synthesis is carried out at 150-220° C. for 6-100 hours. The AlPO4-5 coated electrode and SAPO-34 coated electrode are prepared from 1 $Al_2O_3$: 1.32 $P_2O_5$: 1 $TEA_2O$: 110 $H_2O$ at 150° C. for 20 hours and 1 $SiO_2$: 1.67 $Al_2O_3$: 1.67 $P_2O_5$: 0.89 $TEA_2O$: 93 $H_2O$ at 195° C. for 20 hours. The coated electrode is obtained after hot DDI water rinsing.

Example 25

Mesoporous Silica Coated Electrode (Directing Synthesis Method)

An electrode with a size of 2.5 cm×2.5 cm is cleaned in a series of washing steps designed to remove dirt, grease and oil, solvent, and oxides by using detergent water, acetone, alcohol, and mineral acid (HCl) respectively, before rinsing with water and drying. Mesoporous silica is prepared from a synthesis mixture with a molar ratio of 1 $SiO_2$: 0.12-0.37 SDA: 0.0004-0.004 HCl: 4.4-8.9 $H_2O$: 10-60 EtOH. The clean electrode is positioned vertically in a Teflon holder. The synthesis is carried out at 80-120° C. for 12-72 hours. The mesoporous silica coated electrode is prepared from 1 $SiO_2$: 0.2 CTABr: 0.004 HCl: 5 $H_2O$: 33 EtOH at 100° C. for 24 hours (Note: CTABr is cetyltrimethylammonium bromide). The coated electrode is obtained after hot DDI water rinsing.

Example 26

Pt/HY Zeolite Coated Electrode (Surface Grafting and Dip-Coating Method)

An electrode with a size of 2.5 cm×2.5 cm is cleaned in a series of washing steps designed to remove dirt, grease and oil, solvent, and oxides by using detergent water, acetone, alcohol, and mineral acid (HCl) respectively, before rinsing with water and drying. NaY powder (1 g) is ion-exchanged in 1 M $NH_4NO_3$ (100 ml) at 65° C. for 12 hours before separation by centrifugation and washing to obtain ion-exchanged faujasite Y zeolite. The ion-exchange is repeated at least twice before the powder is recovered, dried, and calcined in air at 550° C. for 6 hours to obtain HY zeolite. 0.3 g of HY zeolite is dispersed in 100 ml of DDI water, and a calculated amount of aqueous solution of $Pt(NH_3)_4(NO_3)_2$ (0.1 g/ml) is added drop by drop with stirring. Stirring is continued for 10 hours and reduction of the incorporated Pt complex within HY zeolite is carried out using fresh-prepared 0.1 M $NaBH_4$ solution. After 10 hours of stirring, the Pt/HY zeolite is collected by filtration, and then washed with DDI water and dried under nitrogen flow at 50° C. The Pt/HY nanoparticle is grafted onto the clean electrode by sequential treatment in 1 vol % 3-mercaptopropyl trimethoxysilane solution in ethanol for 15 minutes and 1.6 wt % Pt/HY suspension in water for 30 seconds, followed by drying at 100° C. for 15 minutes. The process of dipping into suspension and drying is repeated at least twice to obtain Pt/HY zeolite coated electrode.

Example 27

Faujasite Zeolite Coated Electrode (Surface Grafting and Dip-Coating Method)

An electrode with a size of 2.5 cm×2.5 cm is cleaned in a series of washing steps designed to remove dirt, grease and oil, solvent, and oxides by using detergent water, acetone, alcohol, and mineral acid (HCl) respectively, before rinsing with water and drying. NaA or NaX powder (0.75 g) zeolites are dissolved into 2.5 M $H_2SO_4$ solution (4.25 g) to prepare a zeotype or zeolite nanoblock suspension. The zeotype or zeolite nanoblocks are grafted onto the clean electrode by sequential treatment in 1 vol % 3-mercaptopropyl trimethoxysilane solution in ethanol for 15 minutes and diluted zeotype/zeolite nanoblock suspension for 30 seconds, followed by drying at 100° C. for 15 minutes. The process of dipping into suspension and drying is repeated at least twice to obtain faujasite zeolite coated electrode.

Example 28

PEF System with Silicalite-1 Zeolite Coated Electrode

A laboratory setup for a PEF system included a pulsed electric field generator, 4 layers of Silicalite-1 zeolite coated electrode assembly without interlayer spacer inside an electrode holder, a pump, a beaker with approximately 500 ml volume containing bacteria contaminated tape water ($10^4$ CFU/ml of $E.\,coli$), and a stirring plate. The total working surface area for the Silicalite-1 zeolite coated electrode is about 25 $cm^2$. The control electrode assembly is the uncoated electrode with interlayer spacer.

The uncoated electrode is cleaned in a series of washing steps designed to remove dirt, grease and oil, solvent, and oxides by using detergent water, acetone, alcohol, and mineral acid (HCl) respectively, before rinsing with water and drying. The PEF disinfection is carried out for a pulse with a voltage input of 90 V (i.e. electric field density=90 kV/cm), pulse width of 2 ms, and pulse frequency of 100 Hz. During PEF disinfection, a pulse is applied to the electrode assembly while the bacteria contaminated tap water is pumped to the electrode holder with a flowrate of 0.5 L/min. The measured current of the Silicalite-1 zeolite coated electrode assembly is about 50 mA, which is about 60% lower compared to that using a control electrode assembly (~160 mA). Meanwhile, the antimicrobial performance of using a Silicalite-1 zeolite coated electrode assembly is similar to the control electrode assembly, that is about 99% reduction of $E.\,coli$ is achieved.

Example 29

Water Electrolysis with Silicalite-1 Zeolite Coated Electrode

A laboratory setup for water electrolysis included a power supply, current and voltage meter, two Silicalite-1 zeolite coated electrodes (or uncoated electrodes as a control), a beaker with approximately 275 ml volume containing the electrolyte solution, a silicon oil bath, and a stirring hot plate with temperature control. The working surface area for the Silicalite-1 zeolite coated electrodes is about 6.25 $cm^2$.

A control electrode, which is an uncoated electrode, is cleaned in a series of washing steps designed to remove dirt, grease and oil, solvent, and oxides by using detergent water, acetone, alcohol, and mineral acid (HCl) respectively, before rinsing with water and drying. Water electrolysis is carried out at a current density of about 250 $mA/cm^2$ and at a temperature of 70° C. During water electrolysis, it was found that the Silicalite-1 zeolite coated electrode was more corrosion resistant than the uncoated electrode (control). The sacrificial weight loss of Silicalite-1 zeolite coated electrode was little compared to the uncoated electrode. In terms of the oxygen and hydrogen production, water electrolysis with the Silicate-1 zeolite coated electrode is performed similarly with the uncoated electrode.

Example 30

PEF Assembly with Porous Electrodes and Separator

A PEF assembly is composed of porous electrodes and a separator. The porous electrode materials are preferably metals and their alloys particularly stainless steel, aluminum, brass, titanium, and/or tungsten, but could also be conducting carbons, polymers, ceramics, and intermetallics, including composites and coating thereof. The porous electrodes are preferably but not limited to the form of a mesh, but could also be in the form of screen, perforated plates or foils, porous plates and foils, fabrics, papers, micropatterned foils, or any materials containing through porosity. Mesh size is defined as the number of squares in one inch horizontally and vertically. Mesh sizes of 40×40, 50×50, and 100×100 squares per inch are suitable.

The micro-gap between the PEF electrodes is maintained by a thin physical separator that is porous with a separating function and made of insulating material, which is preferably but not limited to water filters, filtration membranes (e.g., microfiltration membrane, ultrafiltration membranes, nanofiltration membranes, and reverse osmosis membranes), ion-exchangers, adsorbers (e.g., activated carbon and activated carbon cloths), or combinations thereof. This allows not only disinfection of microorganisms from drinking water, but also purification of drinking water from unwanted solids and other suspended and dissolved pollutants that affect water quality.

Figure 22:
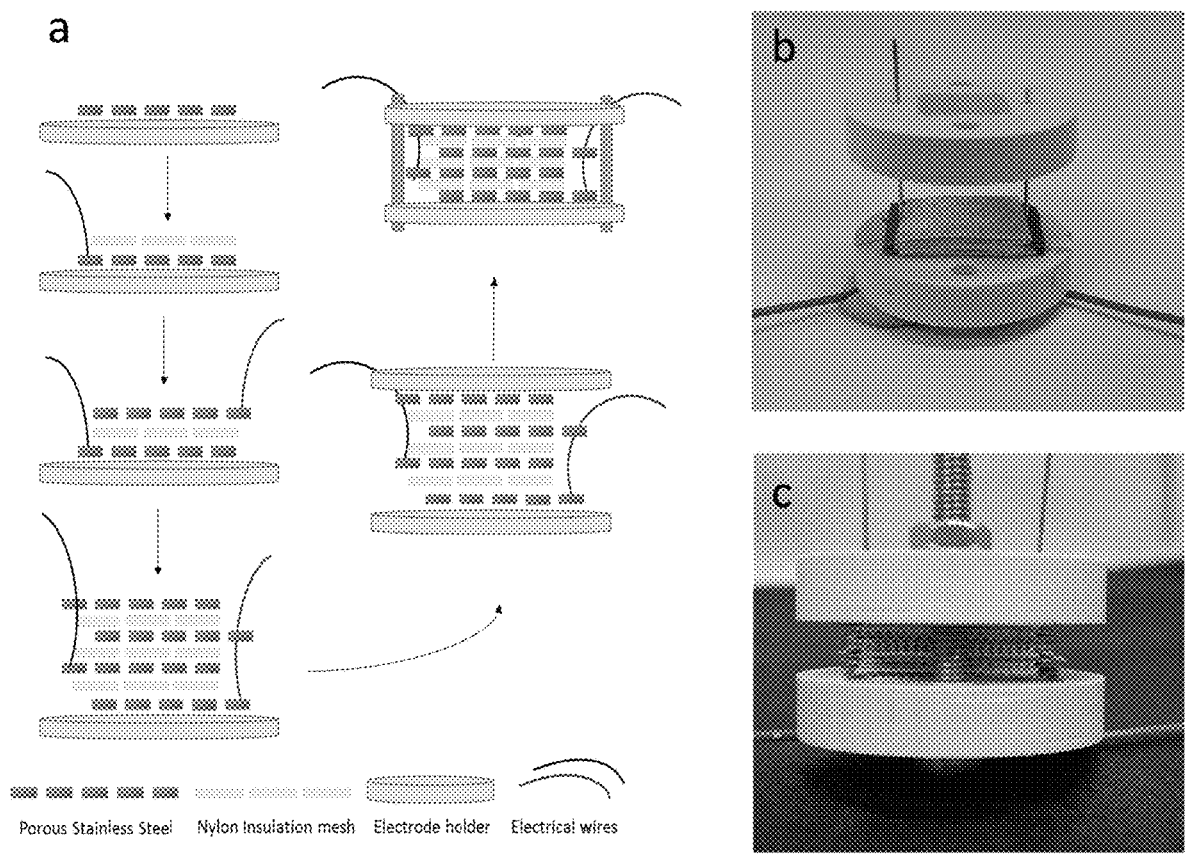
FIG. 22 is (a) a schematic diagram showing the assembly of a POU multi-electrode PEF unit and picture of (b) electrode stacks and (c) an assembled unit.

The PEF assembly is installed so that the direction of the electric field is either perpendicular or parallel to the direction of tap water flow or at an intermediate angle in between. In one example, the PEF assembly can have a minimum of two electrodes with a separator stacked up, but more electrode-separator pairs are preferred, constrained mainly by the preferred overall thickness of 10 mm and water pressure drop of not more than 10%. This typical PEF assembly consists of up to 20 electrode-separator layers with a diameter of 10 mm and thickness of 10 mm as shown in FIG. 22.

In another example, the PEF assembly can have a pair of electrodes with two separators rolled together to give a spiral-wound configuration. This typical PEF assembly has an overall dimension preferably but not restricted to 10 mm in diameter and 20 mm in height (FIG. 17). In another example, the PEF assembly having a pair of electrodes with a separator is made using an "origami" folding technique (FIG. 16). This typical PEF assembly has an overall dimension preferably but not restricted to 10 mm×10 mm×10 mm.

Example 31

PEF Assembly with Porous Electrodes and Microfiltration Membrane Separator

Figure 23:
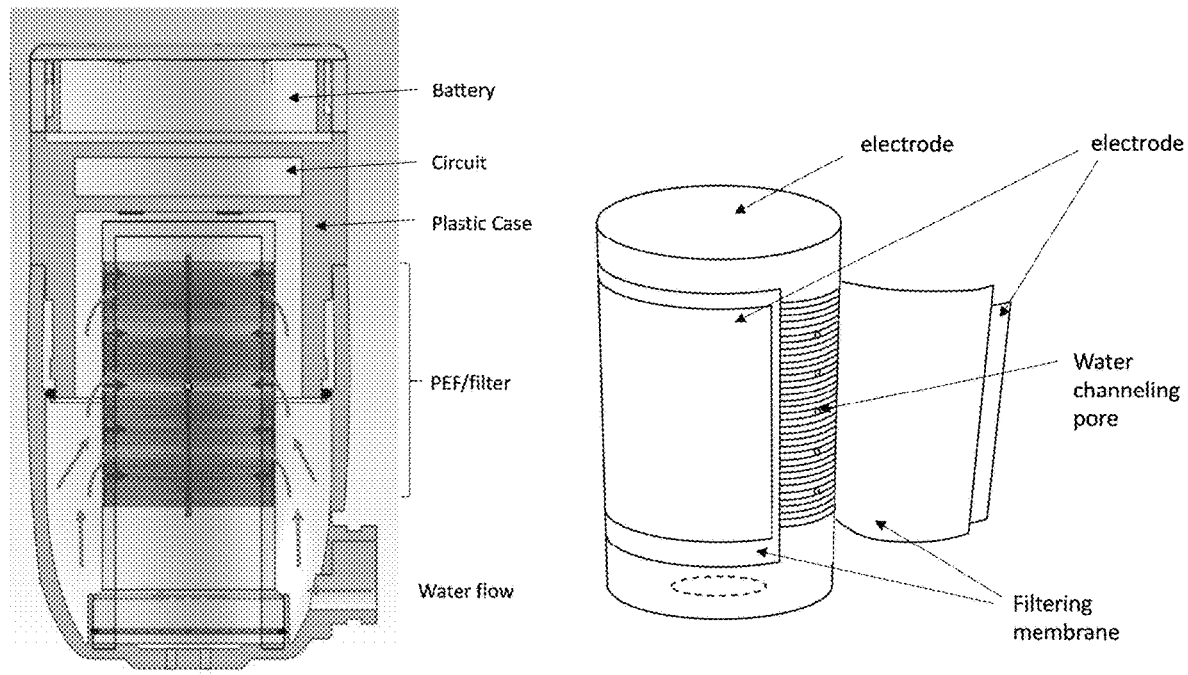
FIG. 23 is a schematic diagram showing the assembly of a POU spiral-wound PEF electrode with a micro-gap maintained by a thin separator (e.g. microfiltration membrane) that could function to separate and remove pollutants from the treated water.
Figure 24:
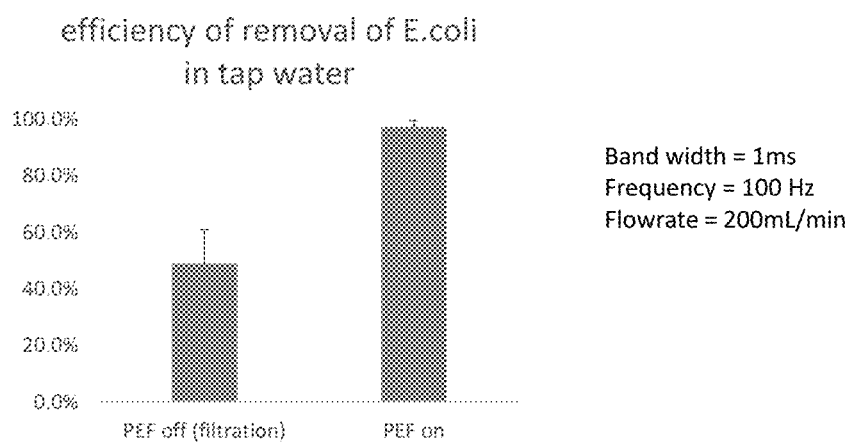

A PEF assembly is composed of a cylindrical body with a pair of porous stainless steel electrodes and a microfiltration membrane separator wound around its outer surface as shown in FIG. 23. The flow is parallel to the electric field. FIG. 24 shows filtration of *E. coli* by the microfiltration membrane was roughly 50%, as determined with PEF turned off. Better than 98% reduction is achieved with the PEF turned on, indicating that PEF is effective in killing waterborne bacteria.

Example 32

PEF Assembly with Porous Electrodes and PVDF Microfiltration Membrane Separator

Figure 25:
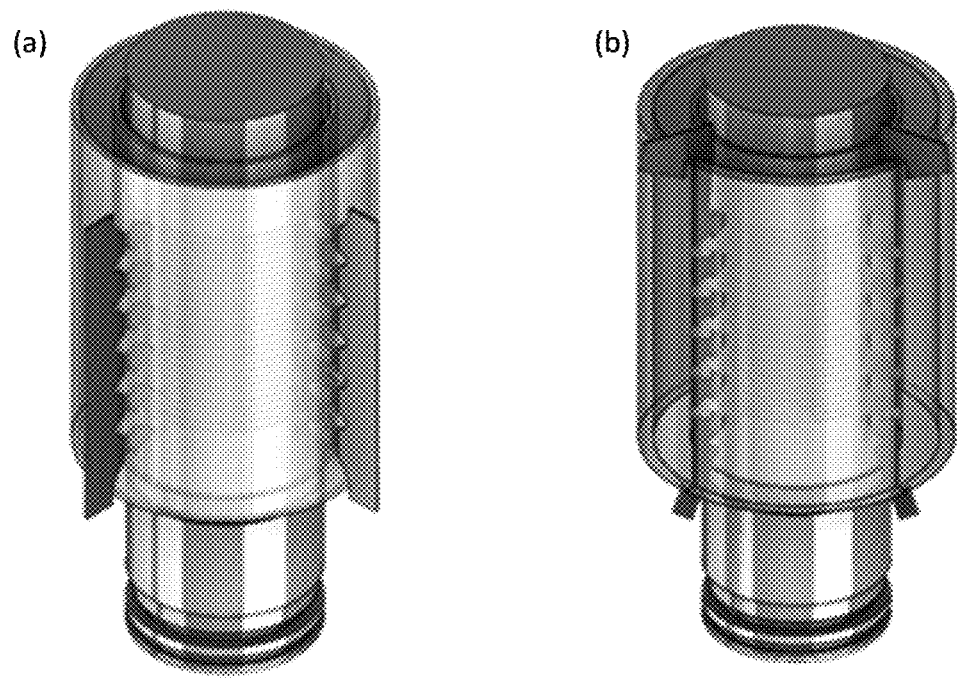
FIG. 25 shows schematic drawings of POU spiral-wound PEF devices (a) using a porous electrode with the micro-gap maintained by a PVDF microfiltration such that the flow and electric field are parallel, and (b) using a nonporous electrode with the micro-gap maintained by a PVDF microfiltration such that the flow is channeled perpendicular to the electric field.

A PEF assembly is composed of a cylindrical body with a pair of porous stainless steel electrodes and a microfiltration membrane separator wound around its outer surface. The flow is parallel to the electric field (FIG. 25*a*). Flow perpendicular to the electric field was obtained by using a dense electrode as shown in FIG. 25*b*.

Figure 26:
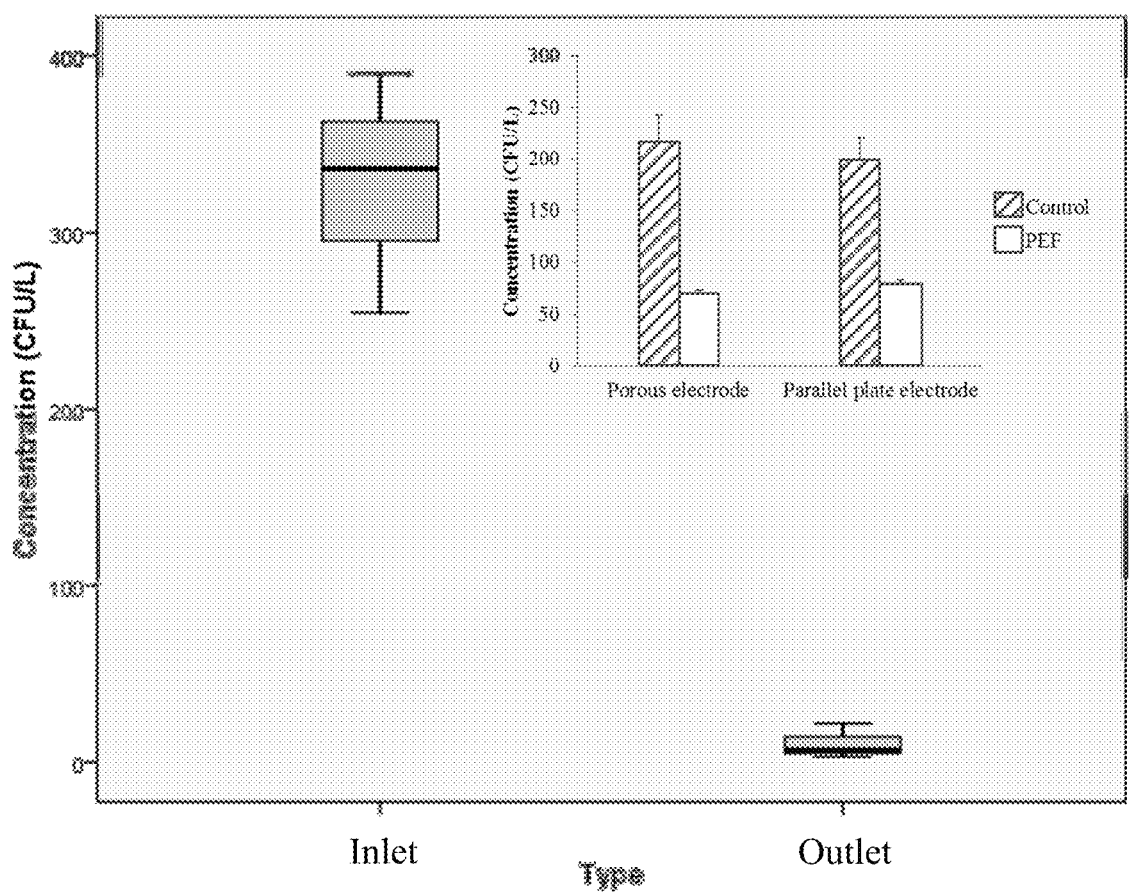
Figure 27:
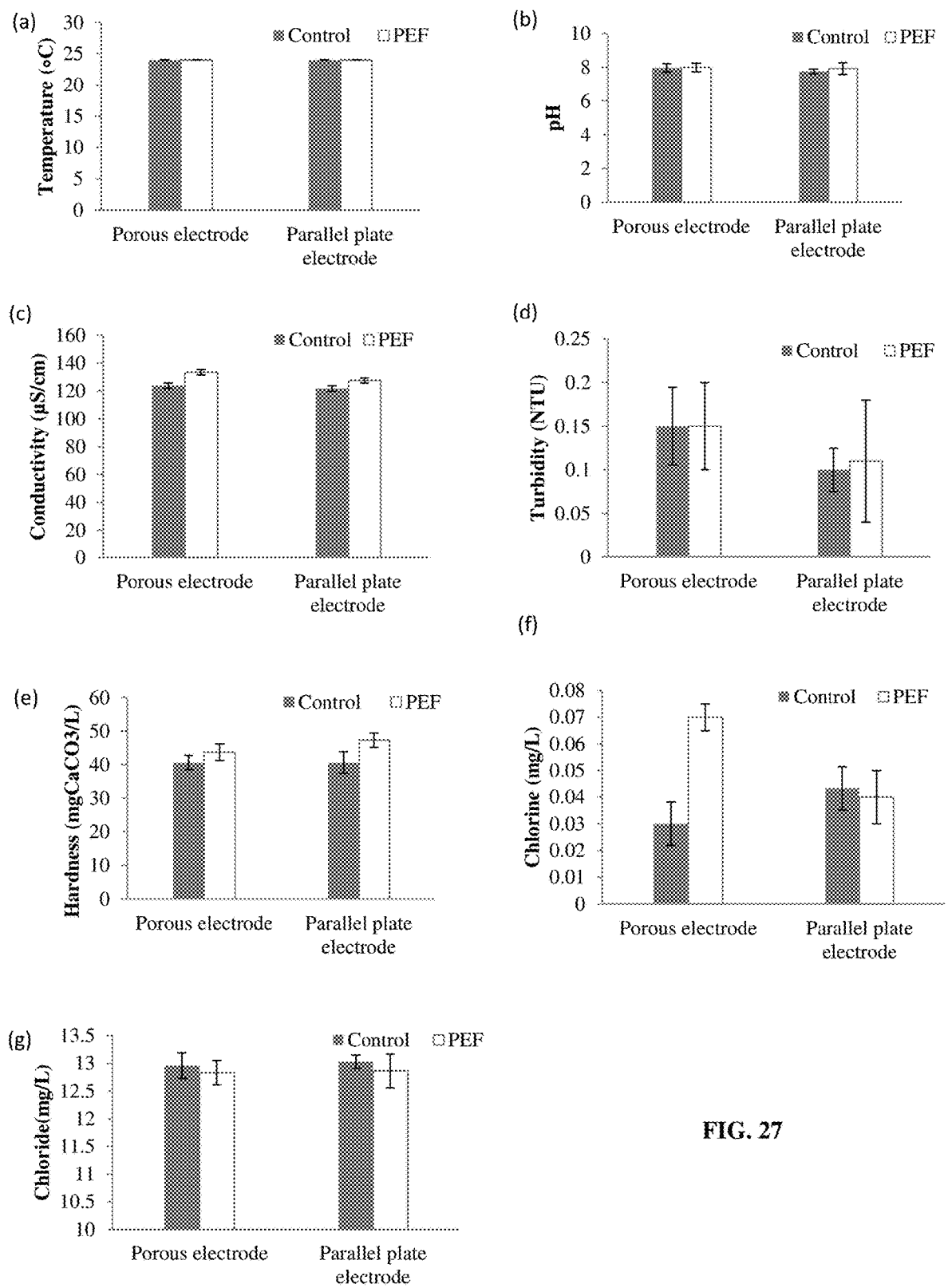
FIG. 27 shows plots of the inlet and outlet (a) temperature, (b) pH, (c) conductivity, (d) turbidity, (e) hardness, (f) free chlorine, and (g) total chlorides of the two POU PEF devices.

Laboratory study at 0.1 L.min$^{-1}$ flow in FIG. 26 shows that there is 98% less *E. coli* bacteria at the PEF outlet than the inlet. Also, there was 99% less viable *E. coli* bacteria on the PVDF microfiltration membrane when the unit was operated as a PEF compared to operation as a filtration unit (i.e., PEF turned off). FIG. 27 shows that the outlet water temperature, pH, conductivity, turbidity, hardness, and chlorine and chloride contents remained relatively unchanged.

Figure 28:
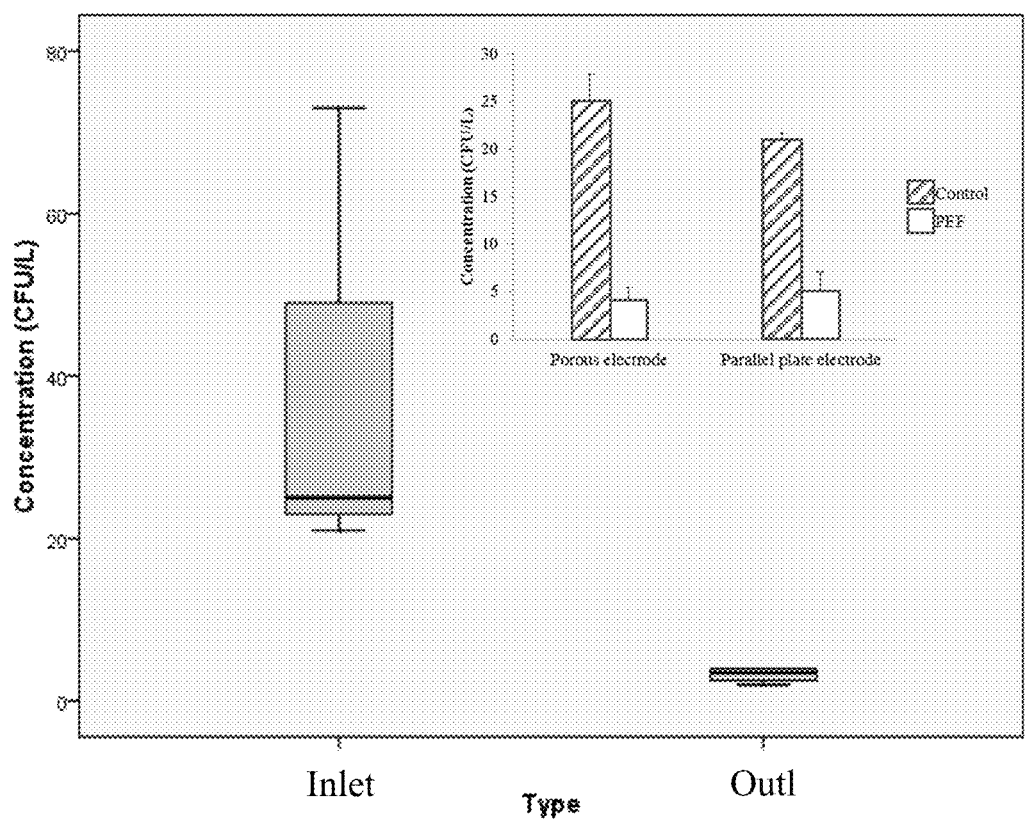
Figure 29:
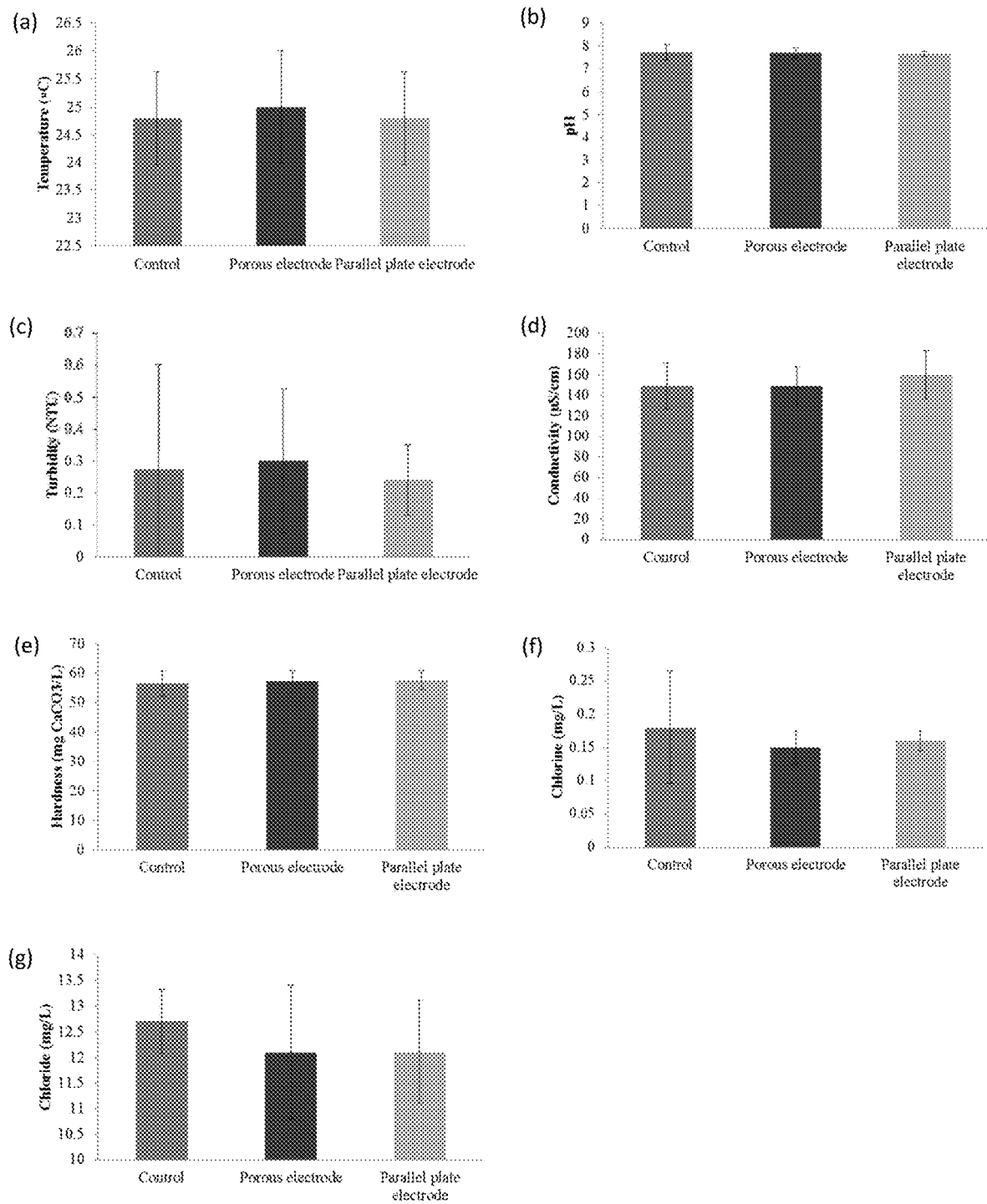
FIG. 29 shows plots of the inlet and outlet (a) temperature, (b) pH, (c) conductivity, (d) turbidity, (e) hardness, (f) free chlorine, and (g) total chlorides of the two POU PEF devices used in the hospital field test.
Figure 30:
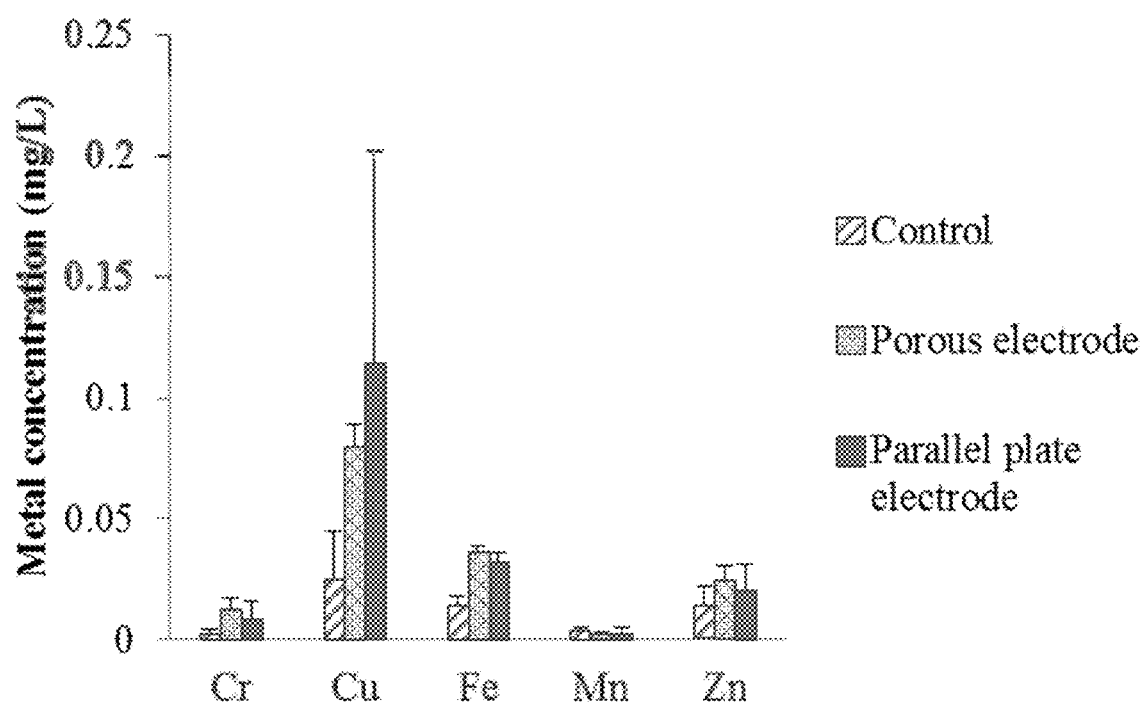
FIG. 30 shows concentration of chromium, copper, iron, manganese, and zinc at the inlet and outlet of the two POU PEF devices used in the hospital field test.

Hospital study was carried out on water tap located in the hospital premise. A water flow of 2 L.min$^{-1}$ flow was used in the study, and as seen from FIG. 28, there is 99% less bacteria at the PEF outlet than the inlet. Also, there was 80% less viable bacteria on the PVDF microfiltration membrane when the unit was operated as a PEF compared to operation as a filtration unit (i.e., PEF turned off). Flow parallel to the electric field performed better than when flow was perpendicular to the electric field. FIG. 29 shows that the outlet water temperature, pH, conductivity, turbidity, hardness, and chlorine and chloride contents remained relatively unchanged. Analysis of the dissolved metals (FIG. 30) shows that PEF operation did not cause an increase in metal level in the treated water.

Figure 31:
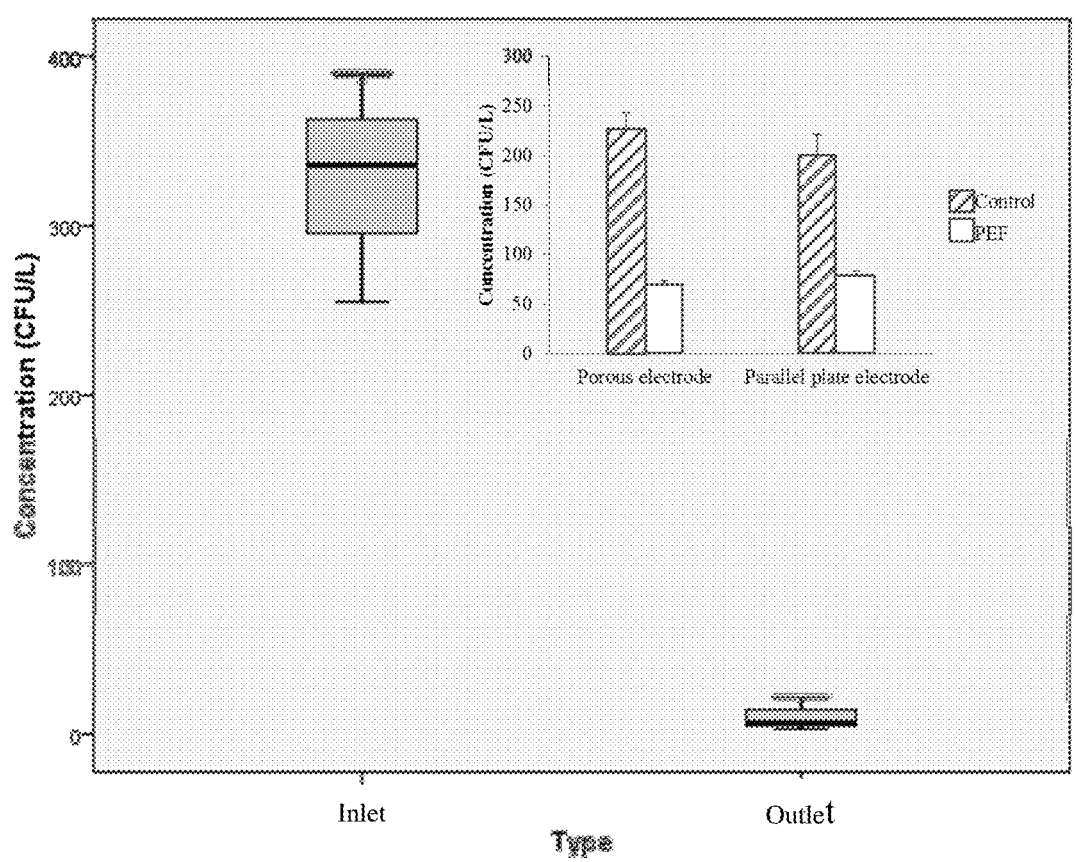
Figure 32:
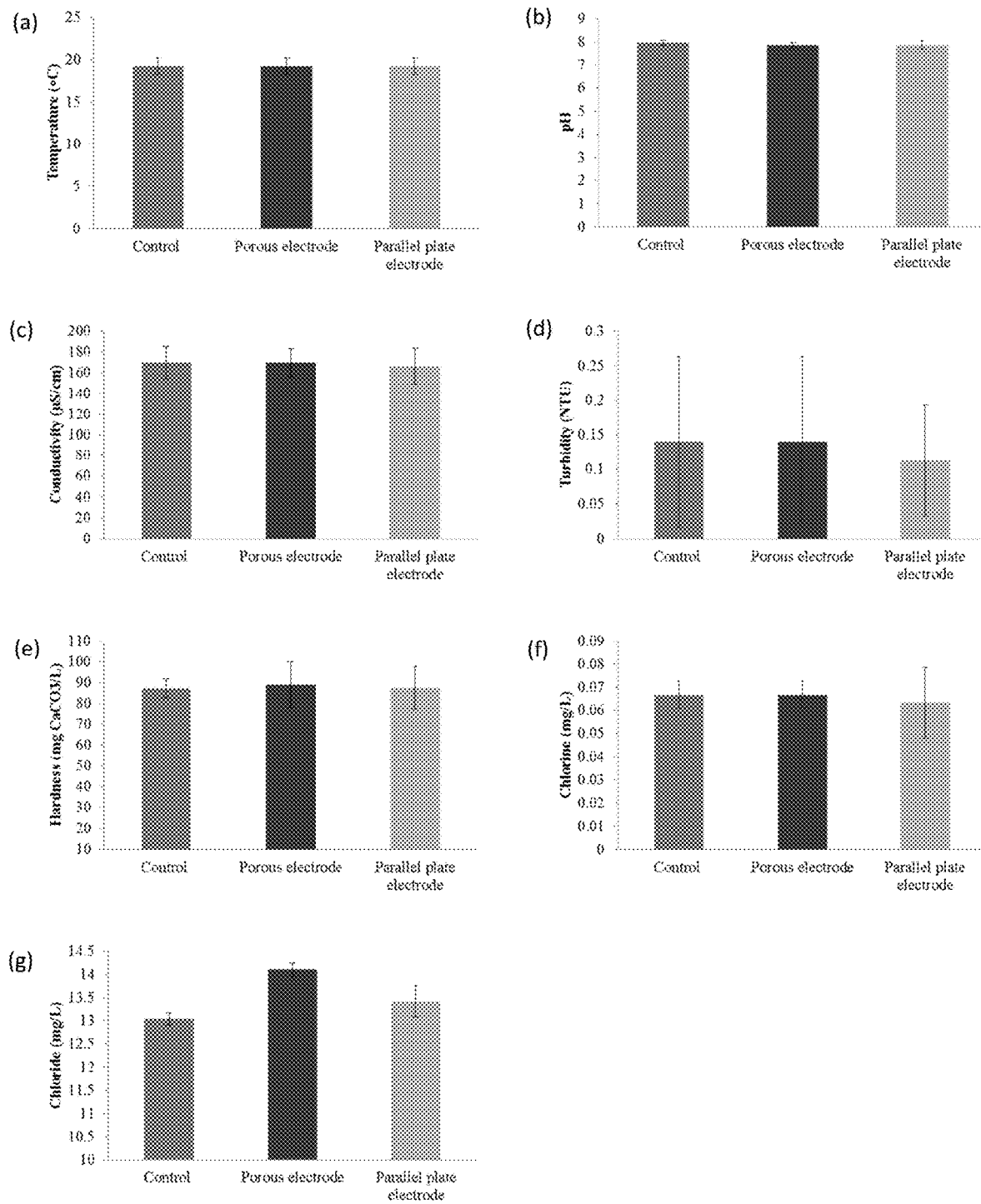
FIG. 32 shows plots of the inlet and outlet (a) temperature, (b) pH, (c) conductivity, (d) turbidity, (e) hardness, (f) free chlorine, and (g) total chlorides of the two POU PEF devices used in the treatment of raw surface water.
Figure 33:
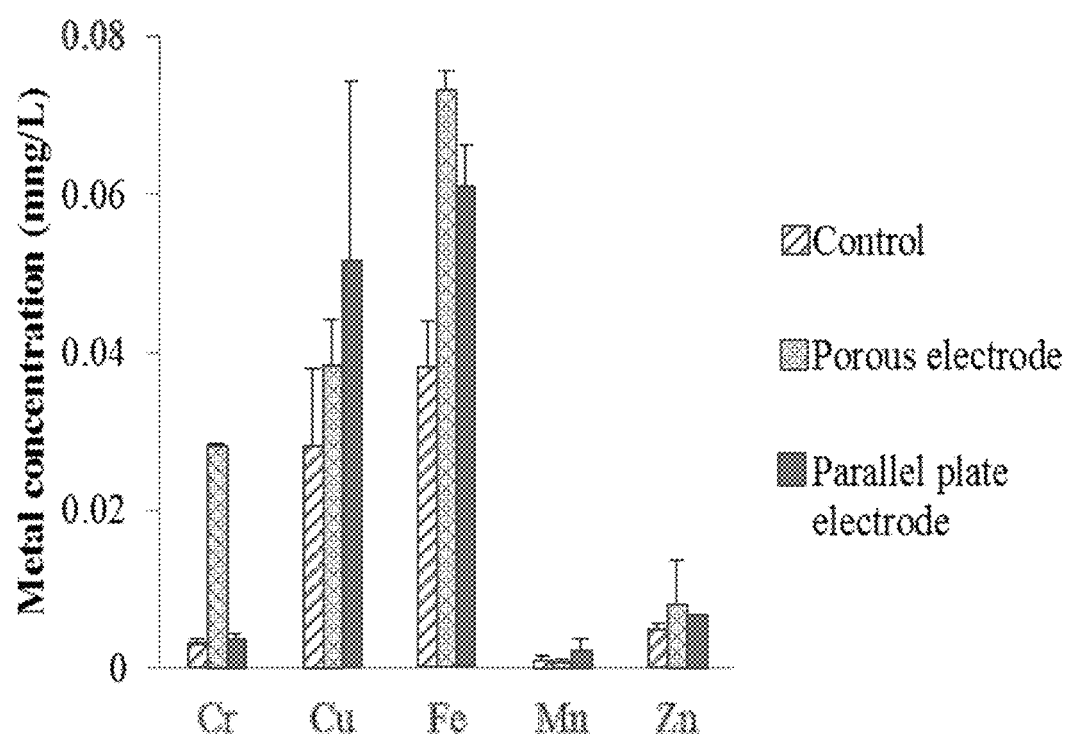
FIG. 33 shows concentration of chromium, copper, iron, manganese, and zinc at the inlet and outlet of the two POU PEF devices used in the treatment of raw surface water.

Raw water from an exposed reflection pond was treated at a water flow of 2 L.min$^{-1}$ flow and shown in FIG. 31. 99% less bacteria at the PEF outlet than the inlet was observed, with about 80% less viable bacteria on the PVDF microfiltration membrane when the unit was operated as a PEF compared to operation as a filtration unit (i.e., PEF turned off). Flow parallel to the electric field performed better than when flow was perpendicular to the electric field. FIG. 32 shows that the outlet water temperature, pH, conductivity, turbidity, hardness, and chlorine and chloride contents remained relatively unchanged. Analysis of the dissolved metals (FIG. 33) shows that PEF operation did not cause an increase in metal level in the treated water.

Figure 34:
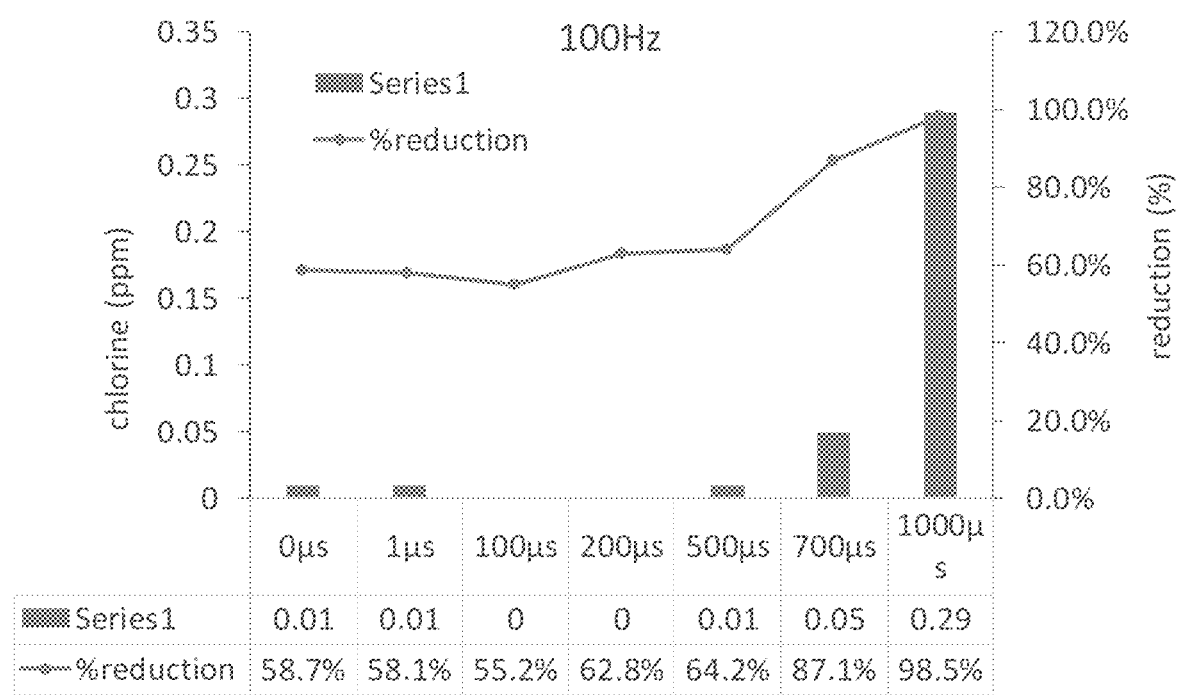
FIG. 34 shows a plot of efficiency in removal of *E. coli* in 3.5% saline.

Brackish water was spiked with *E. coli* and was treated at a water flow of 1 L.min$^{-1}$. FIG. 34 shows that it is possible to attain a high reduction rate while preventing excessive evolution of chlorine by controlling the treatment parameter.

Example 33

PEF Assembly with Porous Electrodes and Carbon Cloth Containing Activated Carbon A PEF assembly is composed of a cylindrical body with a pair of porous stainless steel electrodes and a carbon cloth containing activated carbon separator wound around its outer surface. The flow is parallel to the electric field (FIG. 25*a*). Flow perpendicular to the electric field was obtained by using a dense electrode as shown in FIG. 25*b*.

Example 34

Figure 35:
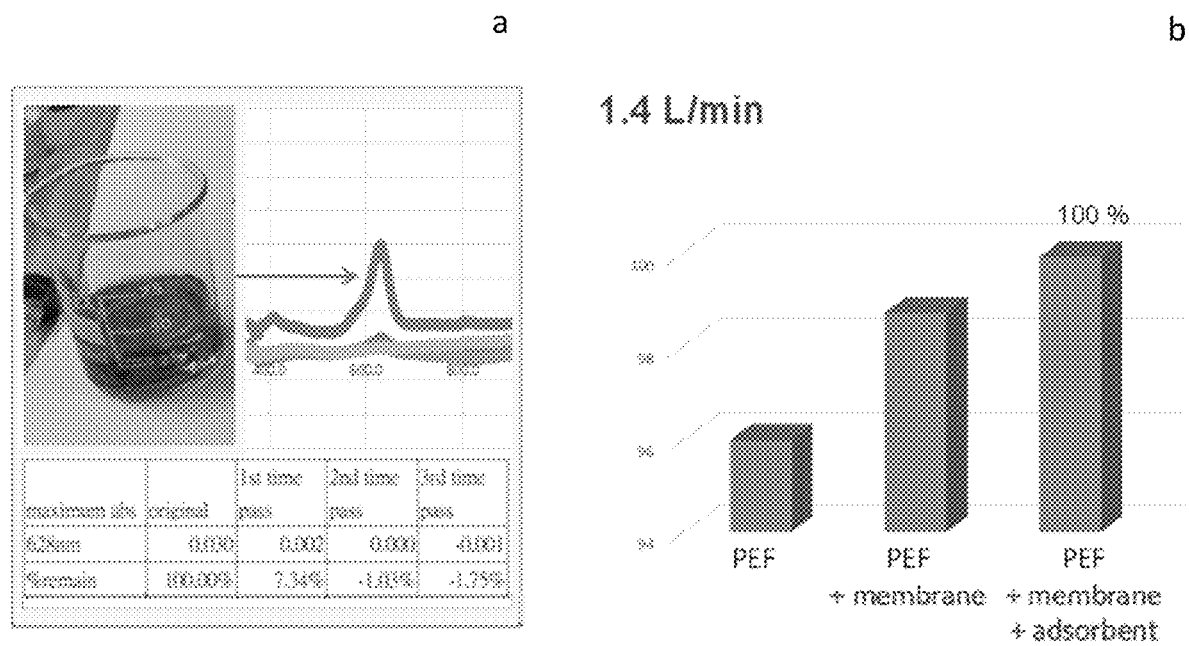
FIG. 35 shows (a) colored dye removal from drinking water and (b) disinfection of *E.coli* by a PEF device with microfiltration membrane incorporated with activated carbon.

PEF Assembly with Porous Electrodes and Activated Carbon Impregnated Microfiltration Membrane Separator A PEF assembly is composed of a cylindrical body with a pair of porous stainless steel electrodes and an activated carbon impregnated microfiltration membrane separator wound around its outer surface. The flow is parallel to the electric field (FIG. 25*a*). Flow perpendicular to the electric field was obtained by using a dense electrode as shown in FIG. 25*b*. The activated carbon was shown to adsorb dyes from water, as shown in FIG. 35*a*. The PEF assembly does not affect the absorption of dye by the activated carbon, and significant enhancement in disinfection of E. coli was observed (FIG. 35b), even at a flow of 1.4 L.min$^{-1}$.

Example 35

PEF Assembly with Porous Electrodes and Ultrafiltration Membrane Separator

A PEF assembly is composed of a cylindrical body with a pair of porous stainless steel electrodes and an ultrafiltration membrane separator wound around its outer surface. The flow is parallel to the electric field (FIG. 25a). Flow perpendicular to the electric field was obtained by using a dense electrode as shown in FIG. 25b.

Example 36

PEF Assembly with Porous Electrodes and Graphene Modified Ultrafiltration Membrane Separator A PEF assembly is composed of a cylindrical body with a pair of porous stainless steel electrodes and a graphene modified ultrafiltration membrane separator wound around its outer surface. The flow is parallel to the electric field (FIG. 25a). Flow perpendicular to the electric field was obtained by using a dense electrode as shown in FIG. 25b.

Example 37

PEF Assembly with Porous Electrodes and Nanofiltration Membrane Separator

Figure 36:
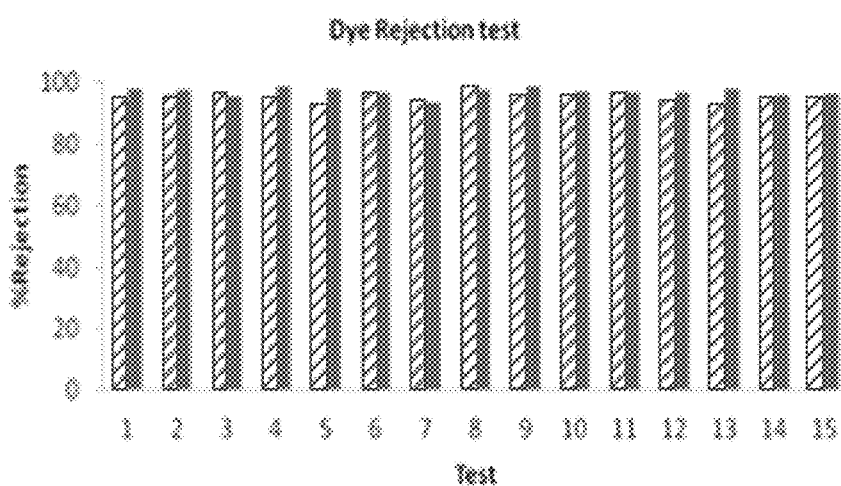
FIG. 36 shows dye rejection by a nanofiltration membrane used in a PEF unit.

A PEF assembly is composed of a cylindrical body with a pair of porous stainless steel electrodes and a nanofiltration membrane separator wound around its outer surface. The flow is parallel to the electric field (FIG. 25a). Flow perpendicular to the electric field was obtained by using a dense electrode as shown in FIG. 25b. FIG. 36 shows the dye rejection by the nanofiltration membrane, indicating that the PEF assembly does not affect the filtration performance of the membrane.

Example 38

PEF Assembly with Nano-Electronic Printed Electrodes and Separator

A PEF assembly is composed of nano-electronic printed electrodes and a separator. The nano-electronic printed electrode is made by printing an electrode pattern on a flexible substrate such as plastics, fabrics, and/or insulated metal foils. The electrode pattern has a preferred size of 50 µm and gap distance of 50 µm. In one example, the electrodes pattern is printed on both sides of the substrate so that one side is positive electrodes and the other side is negative electrodes.

In another example, the electrode pattern consists of parallel positive and negative electrodes patterns printed on both surfaces of the substrate. The electrode materials are preferably metals and their alloys particularly stainless steel, aluminum, brass, titanium, and/or tungsten, but could also be conducting carbons, polymers, ceramics, and intermetallics, including composites and coatings thereof. The separator is porous with a separating function and is made of insulating material preferably but not limited to a membrane or water filter. The PEF assembly is installed so that the direction of the electric field is perpendicular or parallel to the direction of tap water flow. The PEF assembly can have a pair of nano-electronic printed electrodes with two separators rolled together to give a spiral-wound configuration. This typical PEF assembly has an overall dimension preferably but not restricted to 10 mm in diameter and 20 mm in height.

Example 39

PEF Assembly with Porous Electrodes, Separator and Conducting Rod

A PEF assembly is composed of porous electrodes, a separator, and a conducting rod. The porous electrode materials are preferably metals and their alloys particularly stainless steel, aluminum, brass, titanium, and/or tungsten, but could also be conducting carbons, polymers, ceramics, and intermetallics, including composites and coatings thereof. The porous electrodes are preferably but not limited to the form of a mesh but could also be in the form of a screen, perforated plates or foils, porous plates and foils, fabrics, papers, micropatterned foils, or any materials containing through porosity. Mesh size is defined as the number of squares in one inch horizontally and vertically. Mesh size of 40×40, 50×50, and 100×100 squares per inch are suitable.

The separator is porous with a separating function and is made of an insulating material preferably but not limited to a membrane or water filter. The conducting rod materials are preferably metals and their alloys particularly stainless steel, aluminum, brass, titanium, and/or tungsten, but could also be conducting carbons, polymers, ceramics, and intermetallics, including composites and coatings thereof. The conducting rod is in the shape of a rod having holes with a preferred overall dimension of 10 mm in diameter and 40 mm in height, but could also be thinner or thicker depending on the mechanical properties of the materials. The assembly is made by attaching the separator on top of the central core conducting rod, and then attaching the porous electrode on top of the separator.

The PEF assembly can have a central core conducting rod with a minimum of one porous electrode and a separator in between, and the porous electrode-separator pairs are rolled along with the central core conducting rod to give a spiral-wound configuration. The PEF assembly is installed so that the direction of the electric field is perpendicular or parallel to the direction of tap water flow. This typical PEF assembly has an overall dimension preferably but not restricted to 15 mm in diameter and 40 mm in height.

Example 40

PEF Assembly with Nano-Electronic Printed Electrodes, Separator, and Conducting Rod A PEF assembly is composed of nano-electronic printed electrodes, a separator and a conducting rod. The nano-electronic printed electrode is made by printing electrode patterns on a flexible substrate such as plastics, fabrics, and/or insulated metal foils. The electrode pattern has a preferred size of 50 µm and a gap distance of 50 µm. In one example, the electrodes pattern is printed on both sides of the substrate, so that one side is positive electrodes and the other side is negative electrodes.

In an embodiment, the electrode pattern consists of parallel positive and negative electrodes patterns printed on both surfaces of the substrate. The electrode materials are preferably metals and their alloys particularly stainless steel, aluminum, brass, titanium, and/or tungsten, but could also be conducting carbons, polymers, ceramics, and intermetallics, including composites and coatings thereof.

The separator is porous with a separating function and is made of insulating material preferably but not limited to a membrane or water filter. The conducting rod materials are preferably metals and their alloys particularly stainless steel, aluminum, brass, titanium, and/or tungsten, but could also be conducting carbons, polymers, ceramics, and intermetallics, including composites and coatings thereof. The conducting rod is in the shape of a rod having holes with a preferred overall dimension of 10 mm in diameter and 40 mm in height, but could also be thinner or thicker depending on the mechanical properties of the materials. The assembly is made by attaching the separator on top of the central core conducting rod, and then attaching the nano-electronic printed electrode on top of the separator.

The PEF assembly can have a central core conducting rod with a minimum of one nano-electronic printed electrode and a separator in between, and the nano-electronic printed electrode-separator pairs are rolled along with the central core conducting rod to give a spiral-wound configuration. The PEF assembly is installed so that the direction of electric field is in perpendicular or parallel to the direction of tap water flow. This typical PEF assembly has an overall dimension preferably but not restricted to 20 mm in diameter and 40 mm in height.

Example 41

Using PEF Assembly with Porous Electrodes, Separator, and Conducting Rod with Initial *E. coli* Concentration $10^4$ CFU/ml, Pulse Width of 2000 µs, Pulse Frequency of 100 Hz, and Pulse Strength of 90 V A PEF assembly with porous electrodes, a separator, and conducting rod is used for the disinfection of tap water containing $10^4$ CFU/ml of *E. coli*. A pulse with a frequency of 100 Hz and width of 2000 µs is generated by the PEF generator with a pulse strength as 90 V. The pulsed electric field intensity is therefore 9 kV/cm. In an embodiment, 99% of the *E. coli* is reduced.

Example 32

Using PEF Assembly with Porous Electrodes, Separator, and Conducting Rod with Initial *E. coli* Concentration $10^4$ CFU/ml, Pulse Width of 1000 µs, Pulse Frequency of 100 Hz, and Input Voltage of 100 V A PEF assembly with porous electrodes, a separator, and conducting rod is used for the disinfection of tap water containing $10^4$ CFU/ml of *E. coli*. A pulse with a frequency of 100 Hz and width of 1000 µs is generated by the PEF generator with a pulse strength as 100 V. The pulsed electric field intensity is therefore 10 kV/cm. In an embodiment, 99% of the *E. coli* is reduced.

With the information contained herein, various departures from precise descriptions of the present subject matter will be readily apparent to those skilled in the art to which the present subject matter pertains, without departing from the spirit and the scope of the below claims. The present subject matter is not considered limited in scope to the procedures, properties, or components defined, since the preferred embodiments and other descriptions are intended only to be illustrative of particular aspects of the presently provided subject matter. Indeed, various modifications of the described modes for carrying out the present subject matter which are obvious to those skilled in chemistry, biochemistry, or related fields are intended to be within the scope of the following claims.

We claim:

1. A PEF assembly for point-of-use disinfection of water, the PEF assembly comprising:
   a plurality of electrodes making up an anode and a cathode, wherein the plurality of electrodes are zeolite-coated electrodes; and
   a physical separator that is a thin filter, membrane, ion-exchanger, absorber, or combinations thereof, the physical separator having a first surface and an opposite second surface, wherein the physical separator separates and removes unwanted solid, suspended, and dissolved pollutants in water;
   wherein the anode is disposed on the first surface of the physical separator and the cathode is disposed on the second surface of the physical separator.

2. The PEF assembly of claim 1, wherein the PEF assembly is a stand-alone unit or a tap-mounted unit.

3. The PEF assembly of claim 1, wherein the plurality of electrodes are comprised of a conducting material selected from the group consisting of carbon-based materials, ceramics, glasses, intermetallics, composites, and coatings.

4. The PEF assembly of claim 1, wherein:
   a first electrode of the plurality of electrodes is a conducting rod; and
   a second electrode of the plurality of electrodes is one of a nano-electric printed electrode and a porous electrode;
   wherein the second electrode and the physical separator are wrapped around the conducting rod.

5. The PEF assembly of claim 4, wherein the porous electrode is made of a material selected from the group consisting of metals and alloys, conducting carbons, polymers, ceramics, intermetallics, composites, and coatings.

6. The PEF assembly of claim 5, wherein the metals and alloys are selected from the group consisting of stainless steel, aluminum, brass, titanium, and tungsten.

7. The PEF assembly of claim 5, wherein the porous electrode comprises a material having a through porosity selected from the group consisting of mesh, screens, perforated plates and foils, porous plates and foils, fabrics, papers, and micropatterned foils.

8. The PEF assembly of claim 4, wherein the nano-electronic printed electrodes are made by printing an electrode pattern on a flexible substrate.

9. The PEF assembly of claim 8, wherein the flexible substrate is made of a material selected from the group consisting of plastics, fabrics, and insulated metal foils.

10. The PEF assembly of claim 8, wherein the electrode pattern is printed on both sides of the flexible substrate, wherein a first side comprises positive electrodes and a second side comprises negative electrodes.

11. The PEF assembly of claim 8, wherein the electrode pattern consists of a parallel pattern of positive electrodes and negative electrodes, wherein the pattern is printed on both surfaces of the flexible substrate.

12. The PEF assembly of claim 8, wherein the nano-electronic printed electrodes comprise materials selected from the group consisting of metals and alloys, conducting carbons, polymers, ceramics, intermetallics, composites, and coatings.

13. The PEF assembly of claim 12, wherein the metals and alloys are selected from the group consisting of stainless steel, aluminum, brass, titanium, and tungsten.

14. The PEF assembly of claim 4, wherein the conducting rod is made of a material selected from the group consisting of metals and alloys, conducting carbons, polymers, ceramics, intermetallics, composites, and coatings.

15. The PEF assembly of claim 14, wherein the metals and alloys are selected from the group consisting of stainless steel, aluminum, brass, titanium, and tungsten.

16. The PEF assembly of claim 14, wherein the conducting rod is a perforated rod.

17. The PEF assembly of claim 1, wherein the PEF assembly produces a pulsed electric field comprising an intensity of 9 kV/cm; a frequency of 100 Hz; and a width of 2000 μs, and reduces 99% of *Escherichia coli* ($10^4$ CFU/ml initial concentration) in the pulsed electric field.

18. The PEF assembly of claim 1, wherein the PEF assembly produces a pulsed electric field comprising an intensity of 10 kV/cm; a frequency of 100 Hz; and a width of 1000 μs, and reduces 99% of *Escherichia coli* ($10^4$ CFU/ml initial concentration) in the pulsed electric field.

19. The PEF assemble of claim 1, wherein a micro-gap between the anode and cathode is in the range of 10 μm to 300 μm.

20. An assembly for a device for point-of-use PEF disinfection of water comprising:
   a thin physical separator; and
   a plurality of micro-engineered electrodes having a micro-gap between the micro-engineered electrodes,
wherein the plurality of mico-engineered electrodes are folded along a first axis and the thin physical separator is folded along a second axis being orthogonal to the first axis; and wherein the physical separator is positioned between two adjacent micro-engineered electrodes.

21. The assembly of claim 20, wherein the thin physical separator is porous and permeable to water and is selected from the group consisting of water filters, filtration membranes, ion-exchangers, absorbers, and combinations thereof, thus allowing not only disinfection of microorganisms from drinking water, but also purification of drinking water from unwanted solids and other suspended and dissolved pollutants affecting water quality.

22. The assembly of claim 21, wherein the filtration membranes are selected from the group consisting of microfiltration membranes, ultrafiltration membranes, nanofiltration membranes, and reverse osmosis membranes.

23. The assembly of claim 21, wherein the absorbers are activated carbon and activated carbon cloths.

* * * * *